United States Patent [19]

Takiguchi et al.

[11] Patent Number: 5,408,344
[45] Date of Patent: Apr. 18, 1995

[54] REFLECTION TYPE LIQUID CRYSTAL DISPLAY WITH SELECTIVE REFLECTING MEANS

[75] Inventors: Yasuyuki Takiguchi, Kawasaki; Akihiko Kanemoto; Hiroyuki Takahashi, both of Yokohama, all of Japan

[73] Assignee: Ricoh Company, Inc., Tokyo, Japan

[21] Appl. No.: 179,681

[22] Filed: Jan. 11, 1994

[30] Foreign Application Priority Data

| Jan. 11, 1993 | [JP] | Japan | 5-19301 |
| Jun. 30, 1993 | [JP] | Japan | 5-187313 |
| Aug. 30, 1993 | [JP] | Japan | 5-237376 |

[51] Int. Cl.⁶ .................... G02F 1/1335; G02F 1/13
[52] U.S. Cl. .......................................... 359/40; 359/51
[58] Field of Search ............ 359/40, 41, 51, 66, 359/70, 71, 530, 542, 454, 455, 459, 605, 606, 607

[56] References Cited

U.S. PATENT DOCUMENTS

| 4,685,771 | 8/1987 | West et al. | 359/51 |
| 4,726,662 | 2/1988 | Cromack | 350/345 |
| 4,995,701 | 2/1991 | Brown | 359/66 |
| 5,052,784 | 10/1991 | Fergason | 359/52 |
| 5,299,289 | 3/1994 | Omae et al. | 359/95 |

FOREIGN PATENT DOCUMENTS

| 62-91918 | 4/1987 | Japan | 359/70 |
| 63-318519 | 12/1988 | Japan | 359/40 |
| 2058385 | 4/1981 | United Kingdom | 359/70 |

*Primary Examiner*—Anita Pellman Gross
*Assistant Examiner*—Charles Miller
*Attorney, Agent, or Firm*—Oblon, Spivak, McClelland, Maier & Neustadt

[57] ABSTRACT

A reflection type liquid crystal display (LCD) made up of polymer dispersion type display elements each having a liquid crystal dispersion film in which liquid crystals are dispersed in a tridimensional microstructure implemented by a polymer or similar resin. Selective light reflecting or diffusing means introduces forwardly scattered light components from scattering pixels again into a liquid crystal layer without effecting non-scattering pixels. Hence, high reflection intensity and, therefore, high contrast is achieved. A light source unit is positioned such that at least a part of illumination light is reflected in the reflection angle range of the selective reflecting means. Hence, forward scattering with high scattered light intensity can be used, insuring extremely light white display.

18 Claims, 19 Drawing Sheets

REFLECTION TYPE LIQUID CRYSTAL DISPLAY WITH SELECTIVE REFLECTING MEANS

BACKGROUND OF THE INVENTION

The present invention relates to a light scattering type liquid crystal display (LCD) and, more particularly, to a reflection type LCD made up of display elements each having a liquid crystal dispersion layer in which liquid crystals are dispersed in a tridimensional microstructure implemented by a polymer or similar resin.

One of conventional LCD display systems uses a pair of polarizers to implement the birefringence and optical rotary power particular to liquid crystals. This type of display system is operable in a TN (Twisted Nematic) mode or an STN (Super Twisted Nematic) mode. However, the problem with this type of display system is that the display is dark due to the short sharpness in electrooptic characteristic and the presence of two polarizers. When a dichroic dye is added to liquid crystals for a guest-host (GH) effect, a single polarizer suffices and renders the display light to some degree. This approach, however, reduces the contrast to a critical degree. Particularly, in the event of color display, it is impossible to use the TN or STN mode GH type configuration since color display requires a high contrast. It follows that a color LCD implemented by any one of birefringence modes, including a DAP (or VAN) mode and an ECB mode using horizontally oriented cells, has to be provided with an extremely bright back-light. Although LCD elements themselves consume only far smaller power than the other display elements, bright illuminating means critically degrade the power saving feature. Moreover, despite that the LCD elements are originally thin and flat, the illuminating means increases the thickness of the assembly. Even monochromatic display appears dark when the back-light is not used.

An active matrix type LCD has TFTs or MIMs each being assigned to one pixel and can compensate for the short sharpness particular to the TN mode. Therefore, this type of LCD provides far more light display than the above-stated simple matrix type LCD. However, even the active matrix type LCD uses two polarizes and, therefore, cannot implement sufficiently light display without using a back-light. Further, using two polarizers, which are expensive, is undesirable from the cost standpoint. Bonding the polarizers to the LCD elements without introducing air bubbles or creases is difficult, resulting in a substantial decrease in yield. Generally, the polarizers are fabricated by introducing iodine into elongated polyvinyl alcohol (PVA) or by elongating iodine-containing PVA. The polarizers are, therefore, short of resistivity to heat and moisture. It may safely be said that the reliability of the state of the art LCD elements is determined by the polarizers.

A light scattering system using light scattering by liquid crystals in place of the polarizers is a recent achievement and known as a dynamic scattering mode or a phase transition mode. For example, Japanese Patent Laid-Open Publication (Kokai) No. 58-501631 proposes a polymer dispersion type LCD element in which droplets of liquid crystals are dispersed in a polymer matrix. This kind of element is hardly susceptible to the thickness of the liquid crystal layer and implements a broad display area. In addition, such an element does not need any polarizer and, therefore, eliminates light losses which would render the display dark. On the other hand, Japanese Patent Laid-Open Publication No. 1-198725 discloses a polymer network type LCD element in which liquid crystals are dispersed in a tridimensional mesh structure constituted by a photosetting resin. This type of element requires only a low drive voltage and exhibits high sharpness while achieving the advantages stated above in relation to the polymer dispersion type element.

Since the above-described types of LCD elements modulate light and display data due to the light scattering ability of the liquid crystal layer, it is extremely difficult to implement an element for direct watching without relying on the GH configuration. For this reason, such LCDs have heretofore been developed for the application to projection type displays. However, when applied to a projection type display, the element has to be provided with an intense lamp and optics for projection which would increase the thickness more than the back-light scheme. Moreover, the GH type configuration often lacks reliability due to impurities contained in the dichroic dye and products of optical decomposition. In addition, when a polymer and liquid crystal dispersion structure is produced by use of a photosetting resin, it is likely that the dye obstructs the photosetting reaction. This limits the material available for the dispersion structure.

Generally, when the light scattering type LCD element is applied to a reflection type display for direct watching, it is desirable that the background of the element is black. Then, the element will appear black in a transparent state or appear white in a scattering state due to rearward scattering thereof. However, this kind of element has a problem that the intensity of light scattered rearward is not high enough to render sufficient whiteness. Although this problem may be eliminated if the thickness of the liquid crystal layer is reduced, this approach brings about another problem that the required drive voltage increases. Particularly, the polymer dispersion type LCD element originally needs a higher operation voltage than the other scattering type elements. Japanese Patent Publication No. 45-21729 teaches a system in which a mirror surface is provided on the rear of a liquid crystal cell, and means having a black surface is provided on the top of the element to prevent regular reflections of extraneous light from being directly incident to the viewer's eye. In this conventional system, when a given pixel is in a scattering state, scattered light derived from light incident in a direction other than the regular reflection direction is incident to the viewer's eye, providing white display; when the pixel is in a transparent state, the light does not reach the viewer, providing black display. This kind of scheme, however, prevents the LCD from having a flat configuration and causes the lightness of the white portion to be short.

SUMMARY OF THE INVENTION

It is, therefore, an object of the present invention to provide an LCD having a high contrast and requiring a minimum of drive voltage.

It is another object of the present invention to provide an LCD capable of displaying data over a broad area with a high and uniform contrast and, in addition, exhibiting rapid response.

In accordance with the present invention, a reflection type LCD has a cell made up of a pair of spaced light transmitting substrates each having transparent electrodes on the inner surface thereof, and a dispersion layer of liquid crystals held between the pair of substrates, and uses a phenomenon that the dispersion layer turns to a transmitting state when applied with a voltage or to a scattering state when not applied with a voltage. The LCD comprises at least one of selective light reflecting means and selective light diffusing means having angle selectivity and provided on the rear of the dispersion layer with respect to the viewer for transmitting light incident thereto from the viewer's side at angles lying in a particular range and reflecting and scattering, respectively, light incident at angles lying in the other range, and light absorbing means provided on the rear of the selective light reflecting means or the selective light diffusing means for absorbing incident light.

BRIEF DESCRIPTION OF THE DRAWINGS

The above and other objects, features and advantages of the present invention will become more apparent from the following detailed description taken with the accompanying drawings in which.

DESCRIPTION OF THE PREFERRED EMBODIMENTS

Figure 2:
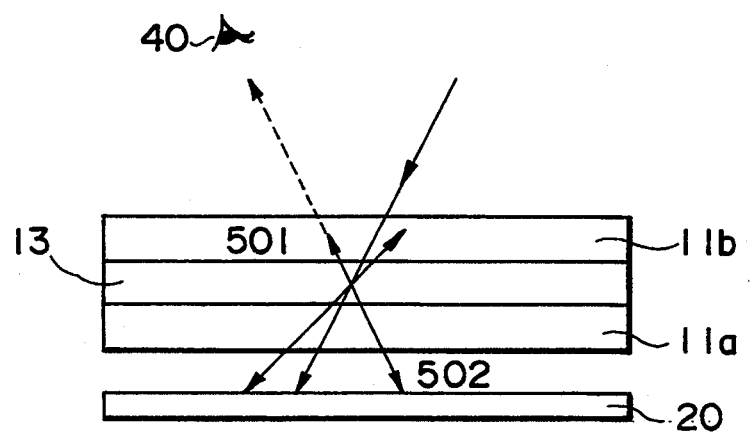
FIGS. 2 and 3 show respectively the paths of light incident to the LCD of FIG. 1 when a liquid crystal dispersion layer of the LCD is in a scattering state and when it is in a transmitting state.
Figure 3:
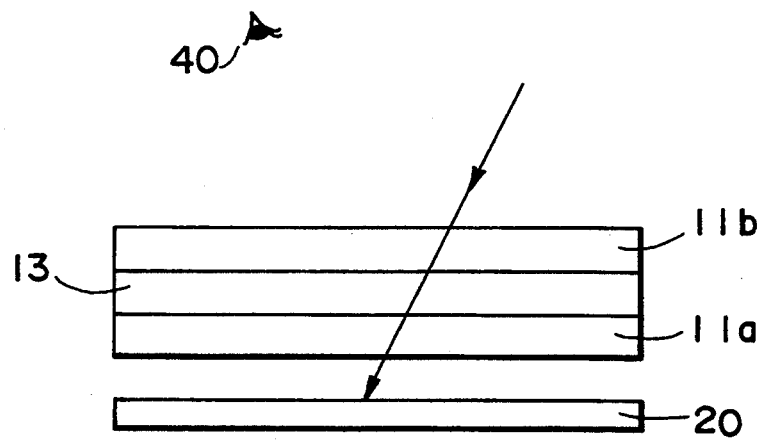

To better understand the present invention, a brief reference will be made to an LCD using a conventional polymer dispersion type liquid crystal cell, shown in FIG. 1. As shown, the LCD has a reflection type liquid crystal cell 10 in which a polymer is dispersed. Specifically, the cell 10 is generally made up of a liquid crystal dispersion layer 13 and light transmitting substrates 11a and 11b. The substrates 11a and 11b carry respectively transparent electrodes, or pixel electrodes, 12a and 12b on the inner surfaces thereof. The dispersion layer 13 is constituted by a liquid crystal section accommodating liquid crystals 13a, and a support 13b made of, for example, a polymer and so configured as to divide the liquid crystal section into minute regions. A black film or similar light absorbing means 20 is disposed below the cell 10. When a voltage is not applied to the cell 10, the orientation of the dispersion layer 13 is disturbed by the walls of the support 13b, causing the refractive index to fluctuate in a very small amount. In this condition, as shown in FIG. 2, extraneous light 50 incident to the cell 10 is scattered by the dispersion layer 13. A part 501 of the light 50 scattered to the rear of the cell 10 advances toward the viewer's eye, so that the dispersion layer 13 appears white. When a voltage is applied to the dispersion layer 13, the crystals are oriented parallel to the direction of an electric field (in the direction of thickness of the layer 13) with the result that the fluctuation of the refractive index decreases. Consequently, as shown in FIG. 3, the incident light 50 is scattered little and advances straightforward to the light absorbing layer 20. Since the light absorbing layer 20 absorbs the light 50, the dispersion layer 10 appears black to the viewer's eye 40.

However, the problem with the conventional LCD is that even when the dispersion layer 13 is in a scattering condition, the light 50 is scattered forwardly in a great proportion, as represented by a component 502 in FIG. 2. As a result, more than one half of the incident light 50 is absorbed by the absorbing layer 20, preventing the dispersion layer 13 from having sufficient whiteness, i.e., from exhibiting a high contrast.

Figure 4:
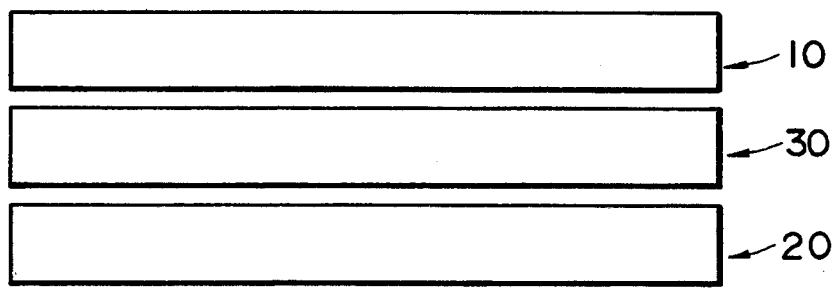
FIG. 4 shows an LCD embodying the present invention.
Figure 5:
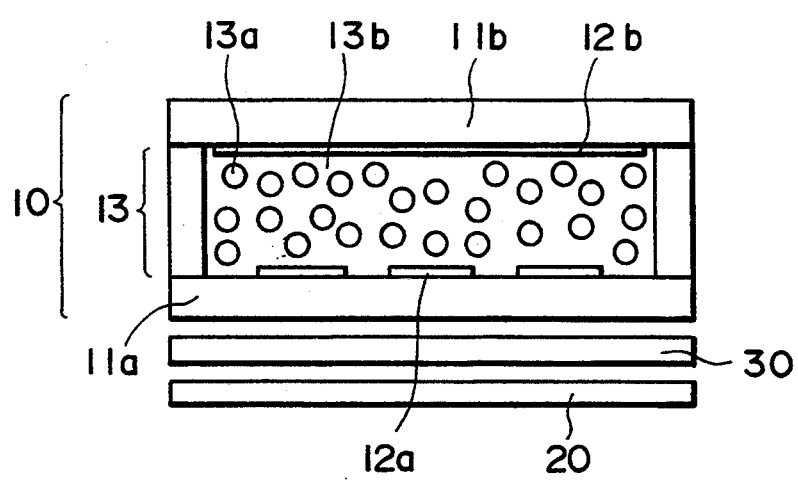
FIG. 5 is a section of the embodiment.

Referring to FIGS. 4 and 5, an LCD embodying the present invention is shown. In the figures, the same constituent parts as the parts of the conventional LCD are designated by the same reference numerals, and a detailed description thereof will not be made in order to avoid redundancy. As shown, the LCD is made up of a liquid crystal cell 10, light absorbing means 20, and selective light reflecting means or selective light diffusing means 30. The selective reflecting or diffusing means 30 is disposed below a liquid crystal dispersion layer 13, i.e., cell 10 and between the cell 10 and the absorbing means 20. The means 30 transmits light incident at angles lying in a particular range, including the viewer's direction, but reflects or scatters the other incident light, preferably to directions in which the viewer cannot see the light.

Figure 6:
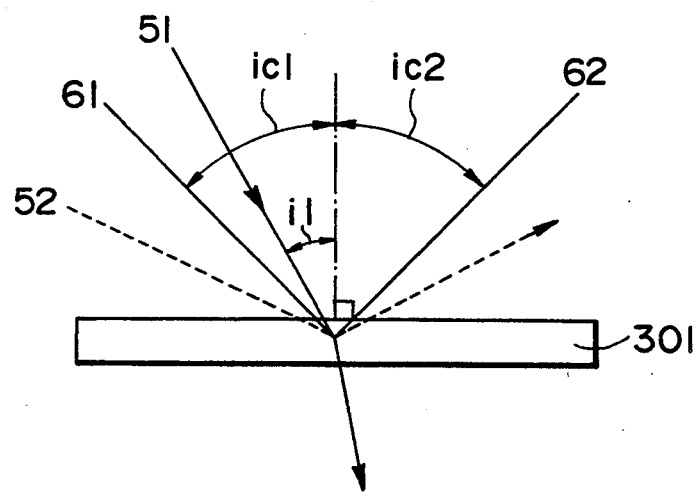
FIG. 6 demonstrates the operation of selective light reflecting means particular to the present invention.
Figure 7:
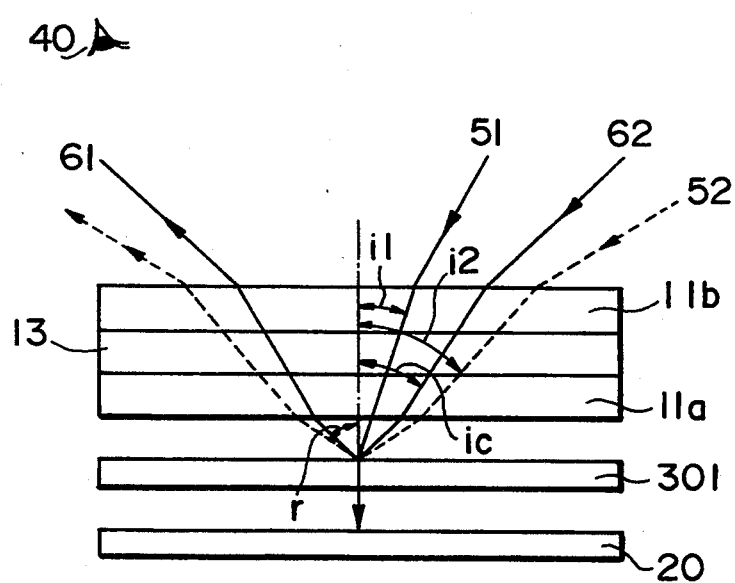
FIGS. 7 and 8 show respectively the paths of light incident to an LCD in accordance with the present invention when a liquid crystal dispersion layer is transparent and when it is in a scattering state.
Figure 8:
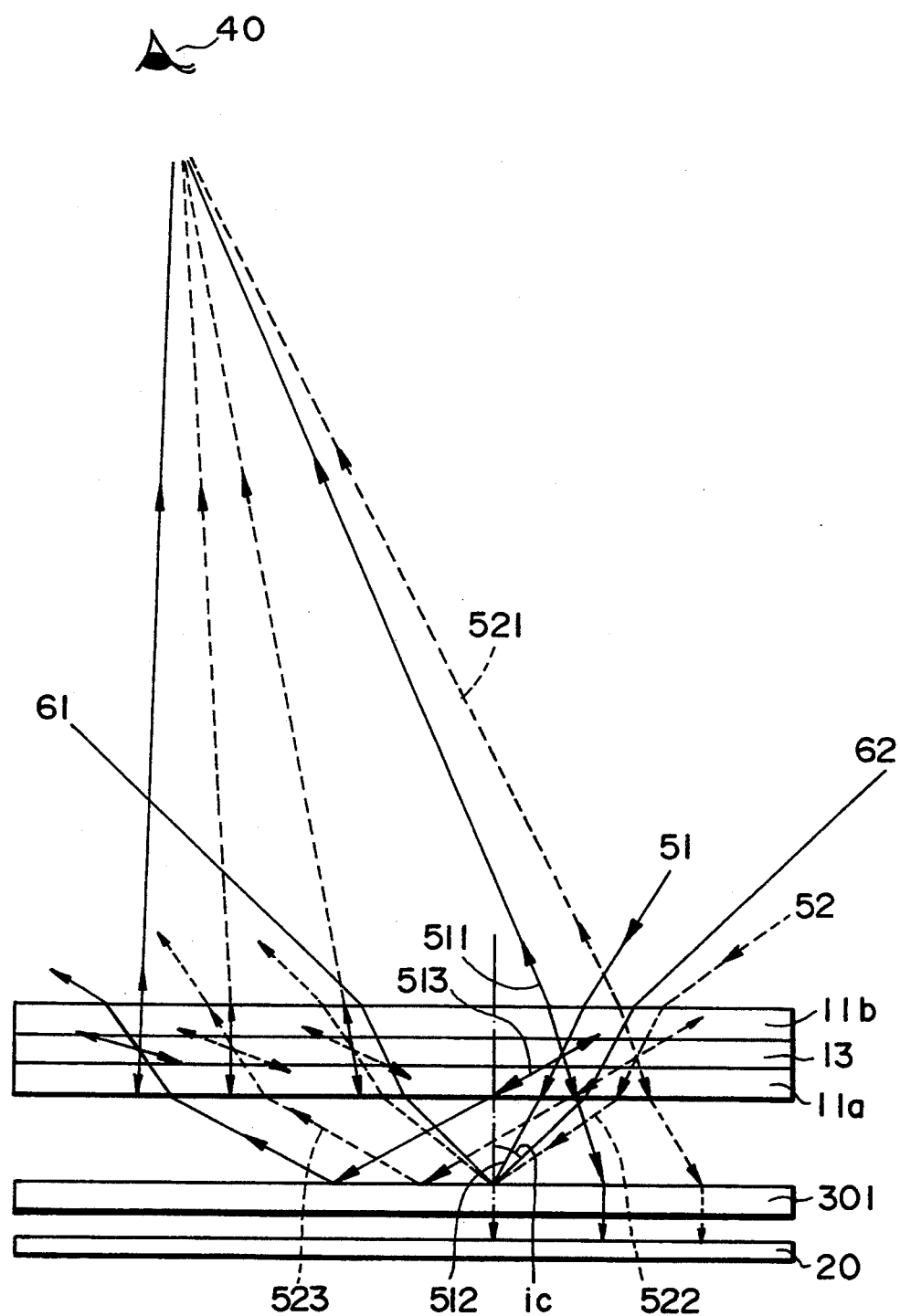

FIGS. 6, 7 and 8 illustrate the operation of the selective light reflecting means 30. In the figures, lines 61 and 62 are indicative of boundaries of incidence angle which cause light to be transmitted or reflected.

As shown in FIG. 6, selective light reflecting means 301 transmits light 51 incident at angles i1 smaller than ic1 and ic2 while reflecting light incident at angles greater than ic1 and ic2. As shown in FIG. 7, when a voltage is applied to the dispersion layer 13 to make it transparent, the light 51 whose incidence angle i1 is smaller than ic is transmitted through the transparent dispersion layer 13 to the selective reflecting means 301. Then, the light 51 is transmitted even through the reflecting means 301 to the absorbing means 20 and absorbed by the means 20. As a result, the light 51 does not reach the viewer's eye 40. On the other hand, light 52 whose incidence angle i2 is greater than the angle ic is reflected by the reflecting means 301 and returned toward the eye 40. However, if the reflection angle r, FIG. 7, is great, the light 52 does not reach the viewer 40 and, therefore, causes the dispersion layer 13 to appear black to the viewer 40.

FIG. 8 shows optical paths to be set up when the dispersion layer 13 is in the scattering state. As shown, the incident light 51 is scattered by the dispersion layer 13, and a part 511 of the rearward scattered components reaches the viewer 40. A part 512 of the forwardly scattered components, which is incident to the selective reflecting means 301 at an angle smaller than ic, is transmitted through the reflecting means 301 and then absorbed by the absorbing means 20. However, a component 513 whose incidence angle is greater than ic is reflected by the reflecting means 301, again incident to and scattered by the dispersion layer 13, and then partly propagated to the viewer 40. The incident light 52 is also scattered by the dispersion layer 13 with the result that a part 521 of the rearward scattered components reaches the viewer 40. Many of the forwardly scattered components which are intense, i.e., components 522 and 523 are incident to the reflecting means 301 at angles greater than ic and, therefore, reflected by the reflecting means 301 to the dispersion layer 13. As a result, the components 522 and 523 are again scattered by the dispersion layer 13 and partly brought to the viewer 40 as comparatively intense forwardly scattered components. Consequently, among the forwardly scattered components initially scattered by the dispersion layer 13, a part of the components reflected by the reflecting means 301 is incident to the viewer's eye 40 in addition to the rearward scattered components 521 and 511. In the conventional LCD element shown in FIG. 1, such a part of the components which are reflected by the reflecting means 301 is simply absorbed and wasted by the absorbing means 20. Using the incident light effectively as stated above, the LCD element of the present invention renders white in an extremely light condition. Assume that the LCD of the present invention is implemented by a scattering reflector, mirror or similar ordinary reflector which reflects all the light without regard to the incidence angle. Then, despite that the dispersion layer 13 selectively assumes the scattering state or the transparent state, incident light will be reflected to the viewer 40 to produce practically no contrast; when a mirror is used, a contrast will be obtained only when the illuminating light is confined in a particular limited direction.

Figure 9:
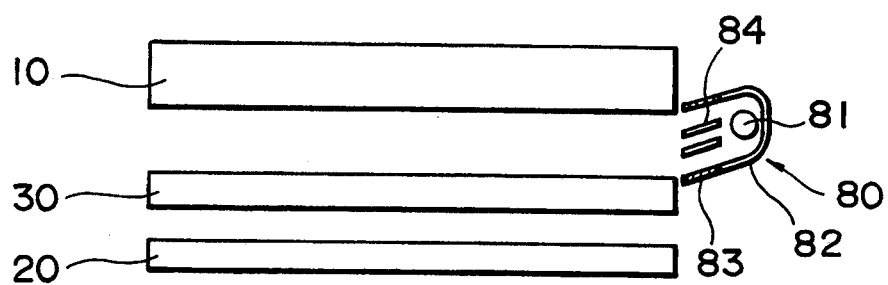
FIG. 9 is a section showing an alternative embodiment of the present invention.

FIG. 9 shows an alternative embodiment of the LCD in accordance with the present invention. As shown, the LCD includes a light source unit 80 for illuminating the selective reflecting means 30. The light source unit 80 is positioned such that light issuing therefrom is incident to the reflecting means 30 at an angular range including the reflection angles of the reflecting means (i>ic1 and i>ic2), FIG. 6. The light source unit 80 has cold or hot cathode tube or similar lamp 81, and a reflector 82, a shield 82 and a louver 84 which adjust the illumination angle in cooperation.

Figure 10:
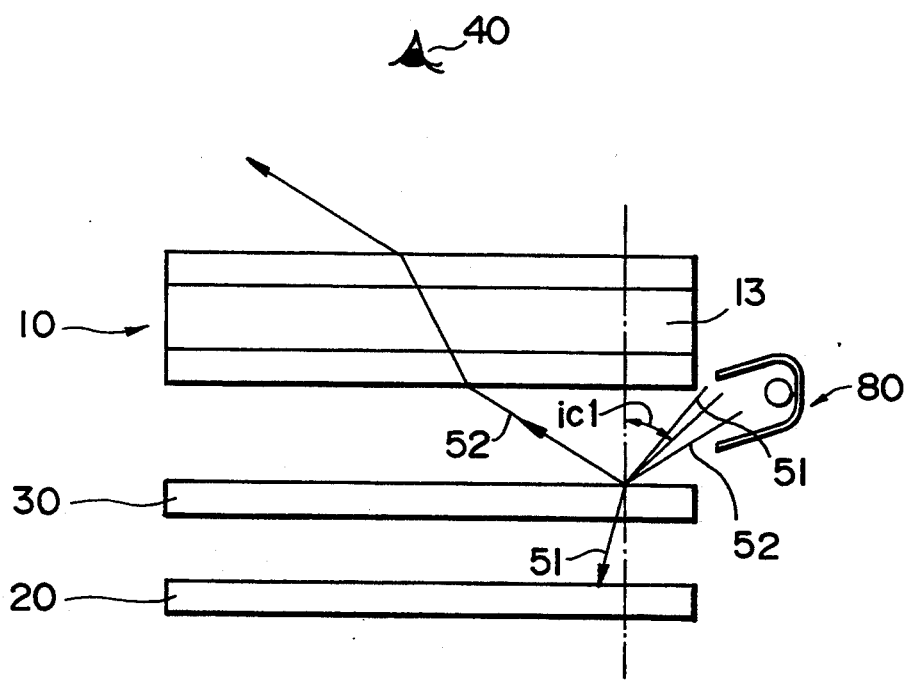
FIG. 10 shows the paths of light incident to the LCD of FIG. 9 to which a voltage is applied.

As shown in FIG. 10, when a voltage is applied to the cell 10 to make it transparent, the light 52 incident to the reflecting means 30 at an angle greater than ic1 is reflected by the reflecting means 30 and then transmitted through the transparent disperion layer 13. However, this part of the incident light does not reach the viewer's eye 40. The light 51 incident to the reflecting means 30 at an angle smaller than ic1 is transmitted through the reflecting means 30 and then absorbed by the absorbing means 20. In this manner, when the dispersion layer 13 is transparent, the light does not reach the viewer 40 positioned outside the angular range of reflections from the reflecting means 30. As a result, the dispersion layer 13 appears black.

Figure 11:
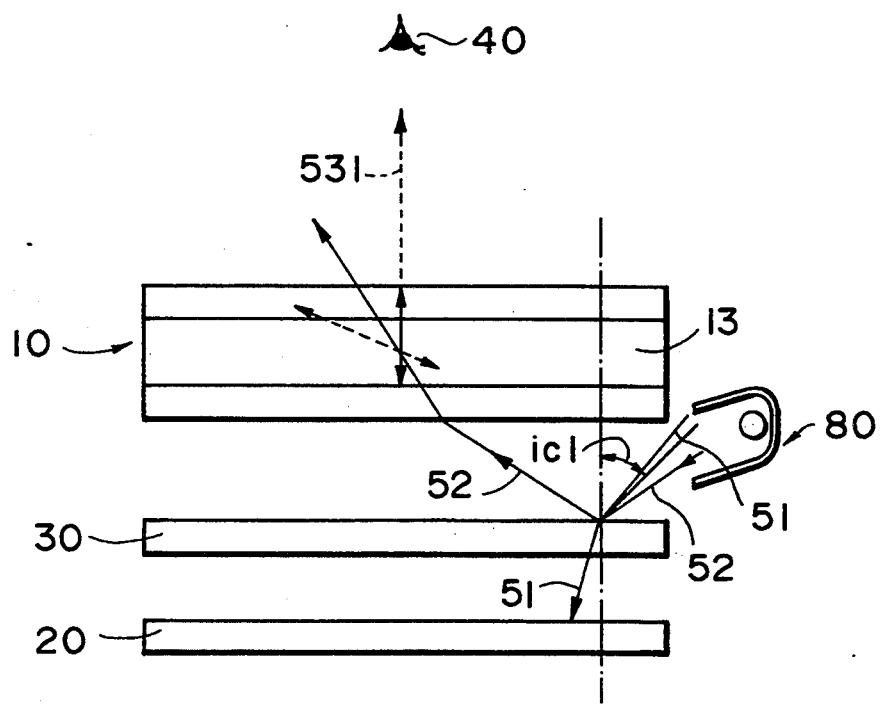
FIG. 11 shows how a liquid crystal layer included in the LCD of FIG. 9 scatters light when not applied with a voltage or applied with a voltage lower than a threshold level.

As shown in FIG. 11, assume that a voltage is not applied or a voltage lower than a threshold level is applied to the dispersion layer 13 to set up the scattering state. Then, the light 52 incident to the reflecting means 30 at an angle greater than ic1 is reflected by the reflecting means 30 and then incident to the dispersion layer 13 to be scattered thereby. A part 531 of the scattered light is steered toward the viewer 40. The light 51 whose incidence angle is smaller than ic1 is transmitted through the reflecting means 30 and then absorbed by the absorbing means 30. In this manner, when the dispersion layer 13 is in the scattering state, the reflections from the reflecting means 30 reach the viewer 40 to render the dispersion layer 13 white. Further, since the light incident to the viewer's eye 40 is the intense forwardly scattered light, it implements a far more light background than the rearward scattered light particular to the conventional LCD.

The prerequisite with the illumination light is that the incidence angle thereof to the reflecting means 30 lies in a range including the range of incidence angle which causes the reflecting means 30 to reflect light. As many light components as possible should preferably exist in the above-mentioned range in order to enhance light display. It is most desirable that all the illumination light are incident to the reflecting means 30 in a range which causes the reflecting means 30 to reflect light.

Figure 12:
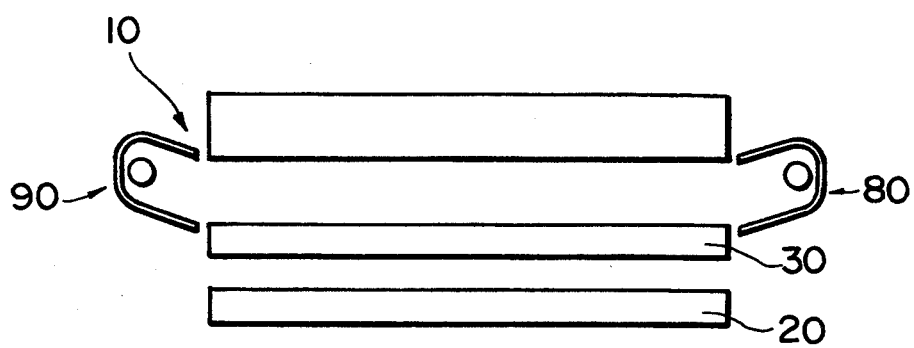
FIG. 12 is a section showing another alternative embodiment of the present invention.

As shown in FIG. 12, the LCD may be provided with a light source unit 90 in addition to the light source unit 80. This is successful in rendering the white background more light and further enhancing a uniform light distribution.

When the light source unit 80 or the light source units 80 and 90 are used, it is preferable to equalize the light throughout the pixels without regard to the distance thereof from the light source unit. For this purpose, means for sequentially reducing the quantity of incident light as the distance from the light source unit decreases may be interposed between the lamp and the dispersion layer 13.

While the foregoing description has concentrated on the illumination light issuing from a light source unit, room light, sunlight or similar extraneous light also contributes to the display. The more intense the extraneous light, the more light the display is. In addition, the LCD may be used as a reflection type display without the light source being turned on.

Figure 13:
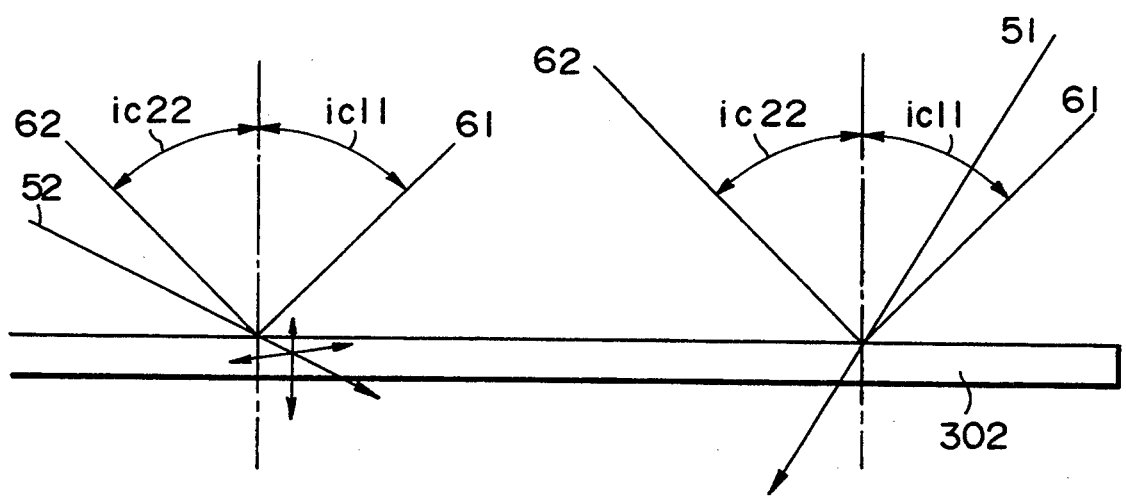
FIG. 13 demonstrates the operation of selective light diffusing means also particular to the present invention.

FIG. 13 shows the selective light diffusing means 30 with which the present invention is practicable. As shown, selective diffusing means 302 transmits light incident at angles smaller than ic11 and ic22, e.g., light 51 while diffusing light incident at the other angles, e.g., light 52. Lines 61 and 62 are indicative of boundaries between transmission or reflection.

Figure 14:
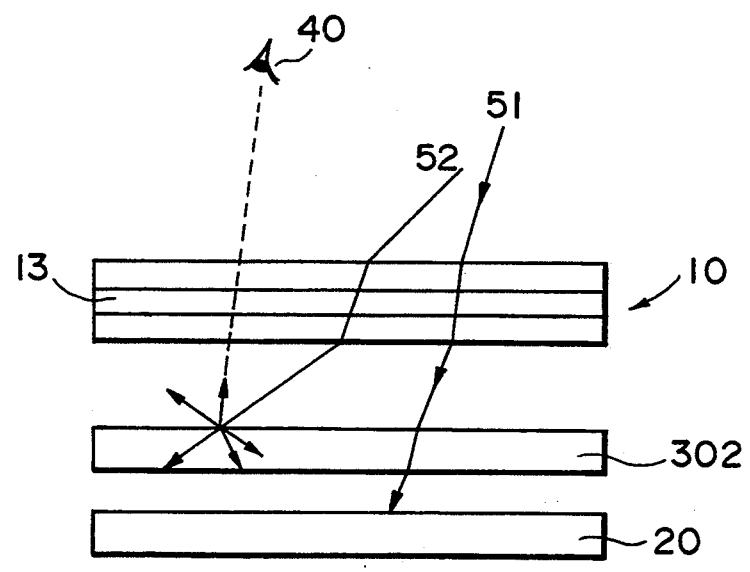
FIGS. 14 and 15 show respectively the paths of light incident to the selective diffusing means when a liquid crystal layer is in a transparent state and when it is in a scattering state.

As shown in FIG. 14, when a voltage is applied to the dispersion layer 13 to make it transparent, the light 51 incident to the selective diffusing means 302 at an angle smaller than ic (=ic11=ic22) is transmitted by the dispersion layer 31 and then incident to the diffusing means 302. This part of the light is transmitted even through the diffusing means 302 and then incident to and absorbed by the absorbing means 20, whereby it is prevented from reaching the viewer 40. On the other hand, the light 52 whose incidence angle is greater than ic is scattered by the diffusing means 30. Although this part of the light is returned toward the viewer 40 only in a small amount, most of such light does not reach the viewer 40 since it is a rearward scattered component and, therefore, extremely feeble. As a result, the LCD appears black to the viewer 40.

Figure 15:
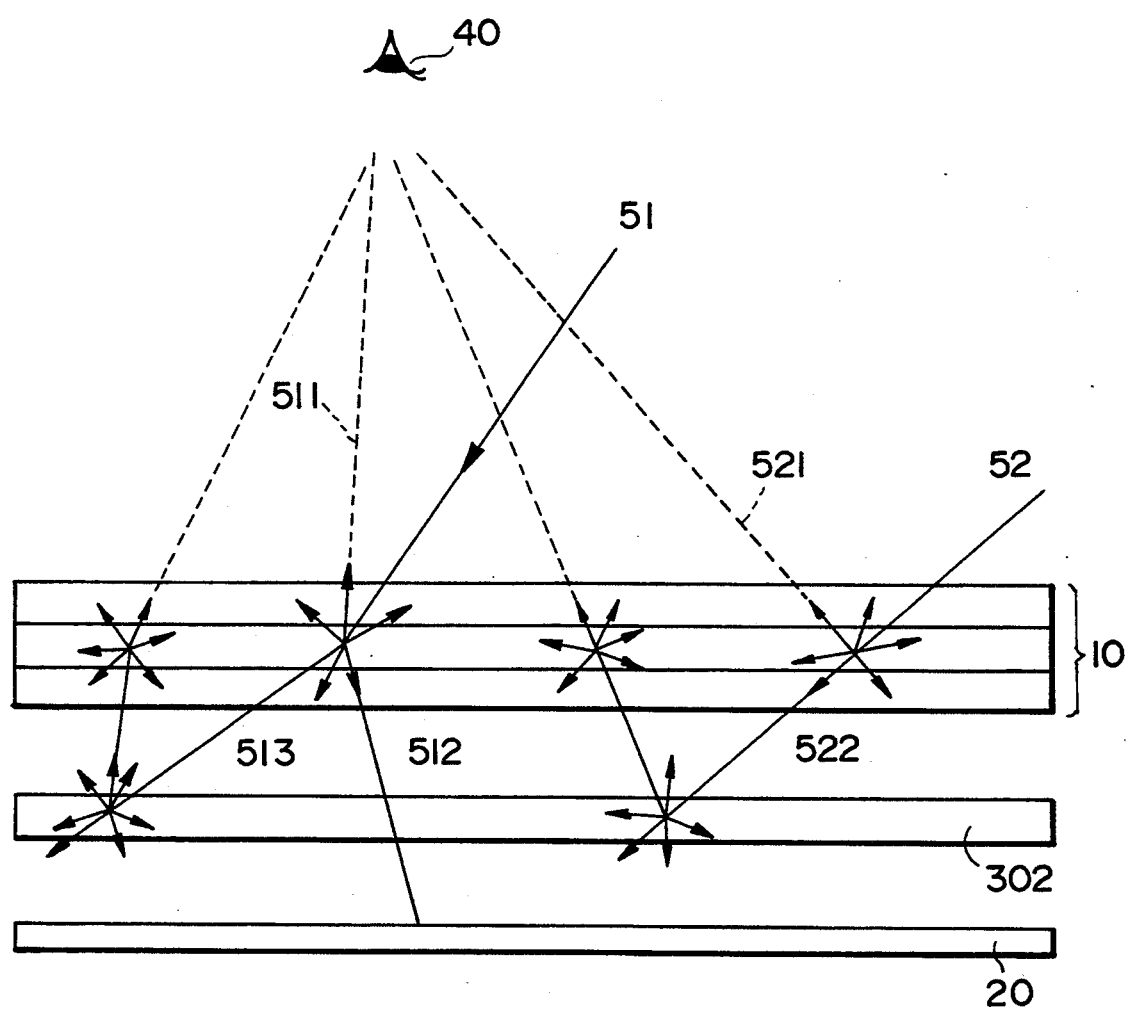

As shown in FIG. 15, when the dispersion layer 13 is in the scattering state, the incident light 51 is scattered by the dispersion layer 13. A part 511 of the rearward scattered components is brought to the viewer 40. A part 512 of the forwardly scattered components which is incident to the diffusing means 302 at an angle smaller than ic is transmitted through the diffusing means 302 and then absorbed by the absorbing means 20. However, a part 513 of the forwardly scattered components whose incidence angle is greater than ic is scattered, partly returned to and scattered by the dispersion layer 13, and then partly brought to the viewer 40. The incident light 52 is also scattered by the dispersion layer 13, and a part 521 of the rearward scattered components reaches the viewer 40. Many of the intense forwardly scattered components, e.g., light 522 is scattered by the diffusing means since the incidence angle thereof to the diffusing means 302 is greater than ic. The light 522 is partly incident to and again scattered by the dispersion layer 13 and then partly incident to the viewer's eye 40. In this manner, among the forwardly scattered components initially scattered by the dispersion layer 13, the components scattered rearward from the diffusing means 302 are also incident to the viewer's eye 40 in addition to the rearward scattered components 521 and 511 of the incident light. In the conventional LCD, the former components are simply absorbed and wasted by the absorbing means 20. The LCD with the selective diffusing means 30 is also successful in using the incident light effectively and, therefore, in rendering white in an extreme light condition.

As stated above, the prerequisite with the selective light reflecting means and selective light diffusing means is that they transmit at least the light incident from an angular range including the viewer's direction, while reflecting or scattering the other light. The selective reflecting means may be implemented by any one of various kinds of prism array sheets. The selective diffusing means may be implemented by, for example, Angle 21 which is a visual field selecting glass available from Nippon Sheet Glass.

The selective reflecting means or selectively diffusing means 30 and the absorbing means 20 may be sequentially arranged at spaced locations or with at least parts thereof contacting each other. When the means 30 and 20 are spaced apart from each other, it is possible to cause the ambient light or the light from a light source to enter the LCD via the gap between them.

Figure 16:
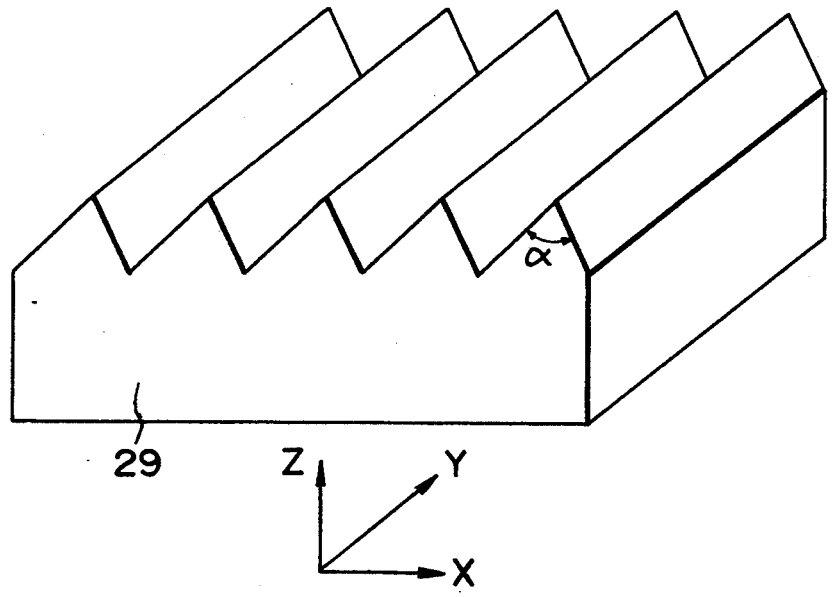
FIG. 16 is a perspective view of selective light reflecting means particular to the present invention and having a group of minute prisms formed on the surface of a light transmitting substrate.

For the selective reflecting means, use may be made of a prism array sheet made up of a flat transparent substrate and an array of prisms formed on the substrate. FIG. 16 shows a prism array sheet 29 which is a specific and preferable form of the selective reflecting means. As shown, the prism array sheet 29 has an array of elongate prisms extending in one direction; the array extends in substantially the lengthwise direction. Each prisms is provided with a substantially triangular cross-section. Three different directions x, y and z are defined in the figure for the sake of description. The directions z, y and x correspond respectively to the thickness of the sheet 29, the length of the prisms, and the direction perpendicular to the directions z and y. The reflection (transmission) characteristic of the sheet 29 will be described hereinafter on the assumption that each prism has an apex angle α of 90 degrees while the refractive index of the material is 1.586.

Figure 17:
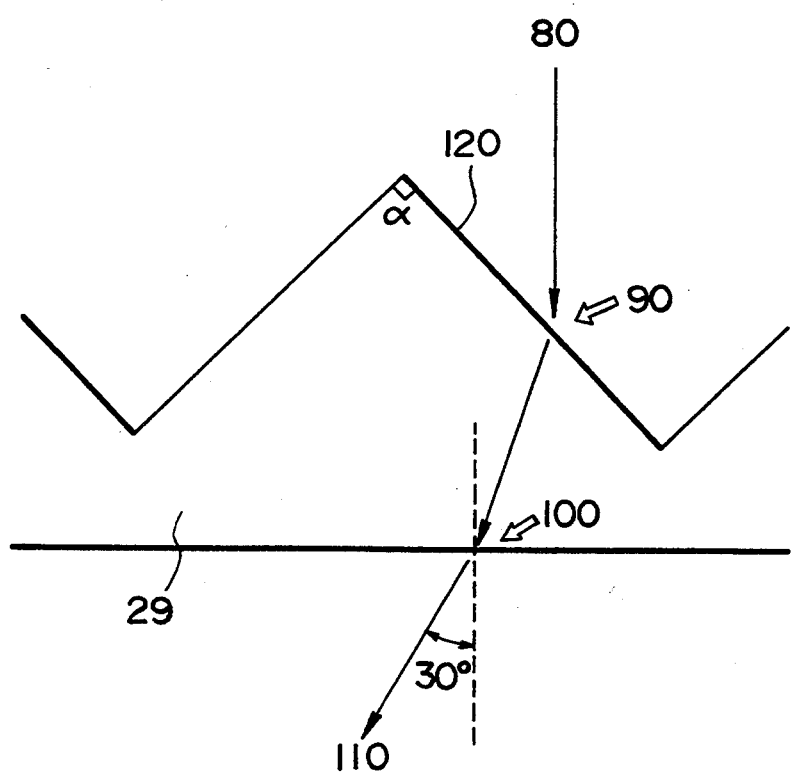
FIG. 17 is a section showing a light reflecting element having prisms whose apex angle is 90°, together with light incident to the element perpendicularly.
Figure 18:
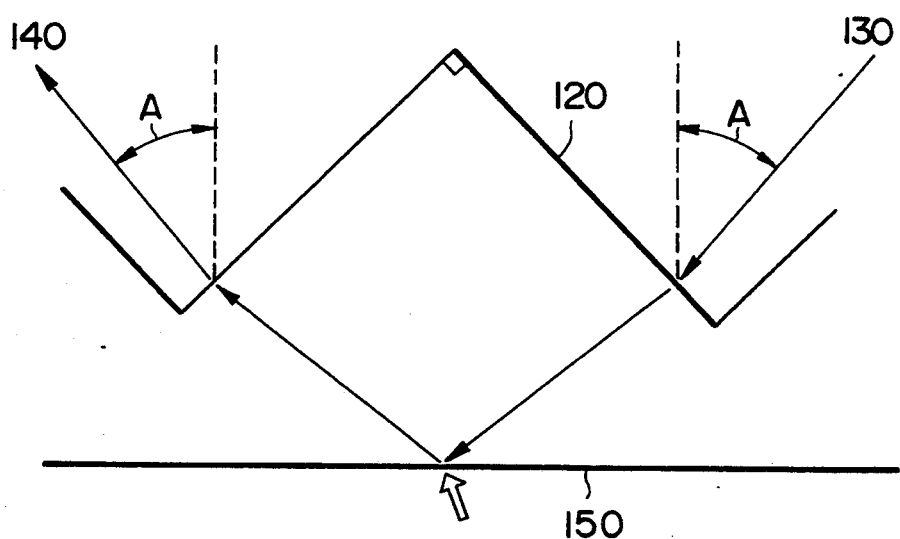
FIG. 18 is a section showing a light reflecting element having prisms whose apex angle is 90°, together with light incident to the edge surface of the prism at 36°.

FIG. 17 shows the prism array sheet 29 whose prisms have an apex angle α of 90°, and light 80 incident to the sheet 29 perpendicularly. The light 80 is refracted at a point 90 where it enters a prism and a point 100 where it leaves the prism, and then output as light 110 having an angle of 30°; that is, the light 80 incident to the sheet surface perpendicularly is transmitted through the sheet. As the optical path of the incident light is sequentially lowered in the direction x perpendicular to the prism array, the output angle of the light sharply increases. When the incidence angle to the sheet surface exceeds 36°, total reflection occurs at the interface between the sheet and air, i.e., the incident light is reflected by the sheet, as shown in FIG. 18. As FIG. 18 indicates, light 130 incident to the edge face 120 of a prism is totally reflected at the interface 150 between the prism and air when the incidence angle A exceeds 36°. As a result, light 140 is output from the prism at the same angle A as the incident light 130.

Assume a prism array sheet whose apex angle α is 90° and refractive index is 1.586 and made of polycarbonate. Then, when the incidence angle ranges from 0° to less than 36° in the direction x, light is mainly transmitted; when the incidence angle exceeds 36, it is mainly reflected. This does not occur when the incident light is inclined in the direction y. When the incident light is inclined in the direction intermediate between the directions x and y, a medium characteristic is obtained. Even when each prism has a substantially triangular cross-section, substantially the same characteristic is achievable although slightly effected by the refractive index, apex angle α, and the symmetricalness of the triangle; light is mainly transmitted when the incidence angle is small or mainly reflected when it is great.

Figure 19:
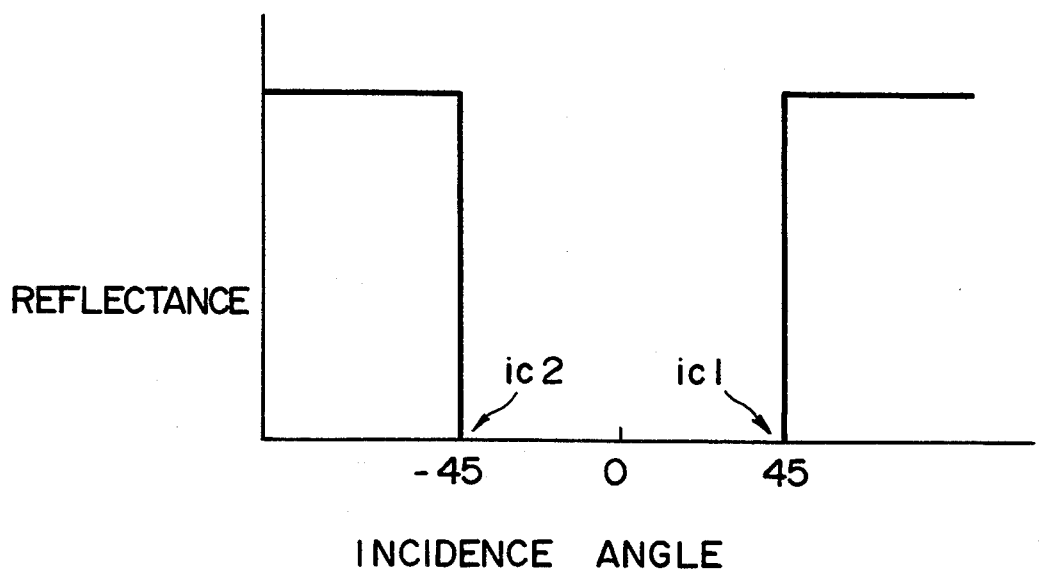
FIG. 19 is a graph indicative of a relation between the reflectance and the incidence angle particular to the prism array sheet shown in FIGS. 14 and 15.

FIG. 19 shows a relation between the reflectance and the incidence angle particular to a prism array sheet having an apex angle of 90° and a refractive index of 1.41. As shown, the sheet transmits light incident in the frontal direction and reflects light incident in the oblique direction. Generally, at the designing stage, the viewer's direction should preferably be coincident with a line normal to the display or inclined less than 30° to the normal line. In the above specific configuration, no reflections reach the viewer since the incident angle of 45° is the boundary between transmission and reflection.

In the prism array sheet, the incidence angles ic1 and ic2 which are the boundaries between transmission and reflection are determined on the basis of the range of visual field angles required of an apparatus. When the angle ic is small, the field angle is reduced although the reflections from the LCD or the light from the diffusing section may be intense enough to provide a high contrast. Conversely, when the angle ic is increased, the advantage of the selective reflecting or diffusing means and, therefore, the contrast is reduced although the field angle may be increased.

Figure 20:
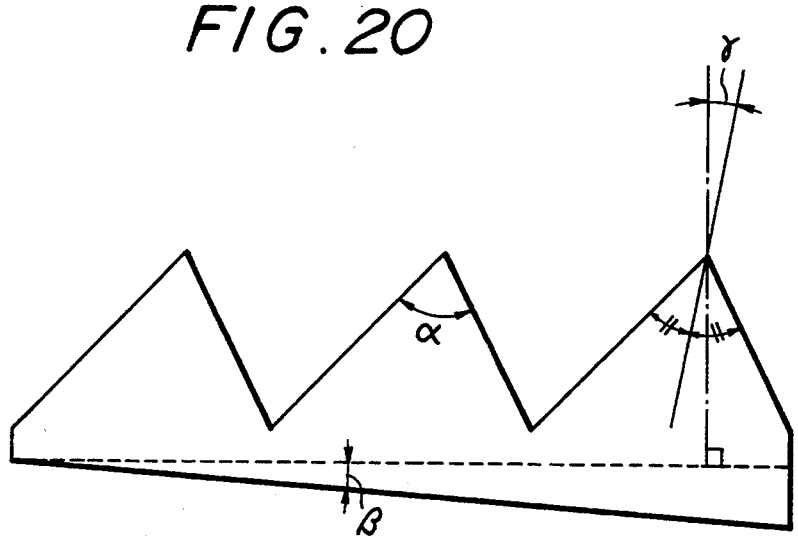
FIG. 20 is a section of selective reflecting means implemented as prisms having an apex angle $\alpha$, an inclination angle of $\beta$ at the bottom, and an inclination angle $\gamma$.

The boundary incidence angles ic1 and ic2 may be adjusted by changing the configuration of the prisms. Specifically, as shown in FIG. 20, the apex angle α of each prism, the inclination angle β of the bottom of the prism, and the inclination angle γ of the prism may be changed to adjust the angle ic. The angular range (Δic=ic1-ic2) of transmitted light increases or decreases with the increase or decrease in the apex angle α. Although the lower limit of ic depends on the kind and usage of an apparatus on which the LCD is mounted as well as on the distance between the LCD and the viewer, it should only be greater than 20° in the case of a word processor or similar apparatus. The angle ic should preferably be 25° to 55°, more preferably 35° to 50°. To implement such an angle ic, it is preferable to provide the prism with an apex angle of 30° to 150°, more preferably 40° to 140°, in consideration of the refractive index range of glass or plastics (1.4 to 2.0) applicable to the prism. The preferable range of apex angles depends on the refractive index of the material forming the prism, as follows. When polysiloxane or similar material having a relatively small refractive index (1.4 to 1.5) is used, the apex angle should preferably range from 30° to 130°. When use is made of a material having a relatively great refractive index (1.5 to 2.0), the apex angle should preferably range from 60° to 150°. Although the light of the LCD increases with the decrease in apex angle α, small apex angles α broaden the angular range for causing total reflection excessively to thereby prevent the light of the LCD from decreasing in the transparent state. This reduces the field angle range in which the contrast is high. On the other hand, excessively great apex angles α would lower the light when the LCD is in the scattering state, resulting in dark display.

Both the inclination angle of the bottom and that of the prism may have their ranges of selective transmission angles configured asymmetrically with respect to the normal line. Considering the preferable direction of observation (within 30 degrees to the normal line), it is preferable that the inclination of the bottom and that of the prism be less than 20° and less than 30°, respectively.

Figure 21:
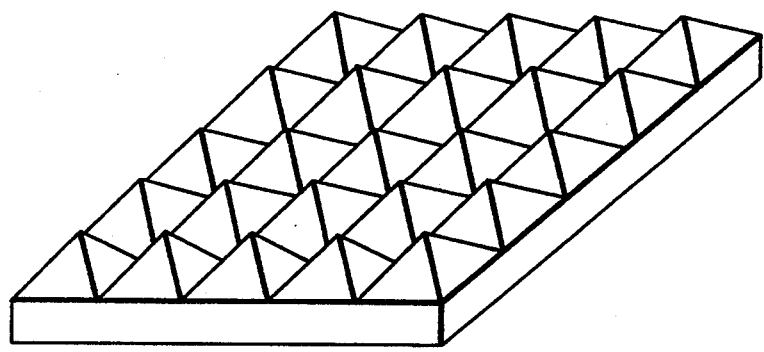
FIG. 21 is a perspective view of selective reflecting means constituted by a bidimensional arrangement of prisms.
Figure 22:
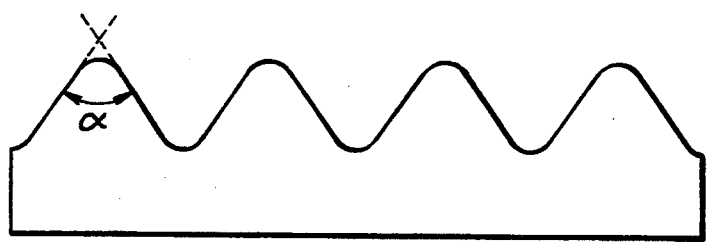
FIGS. 22–26 are sections each showing another specific configuration of the selective reflecting means.
Figure 23:
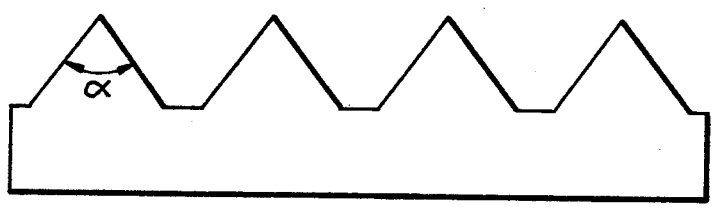
Figure 24:
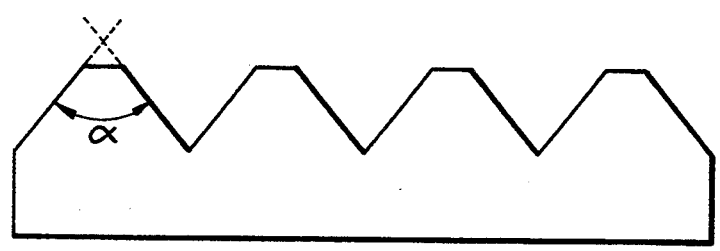
Figure 25:
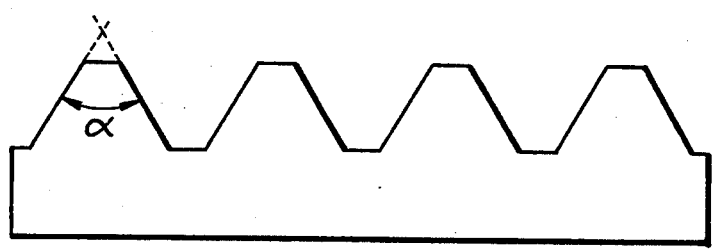
Figure 26:
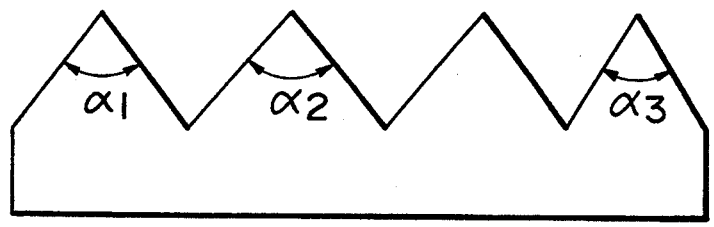

As shown in FIG. 21, the monodimensional prism arrangement shown and described may be replaced with a bidimensional prism arrangement.

FIGS. 22–26 each show other specific configurations of the selective reflecting means 30. The cross-section of the prisms is not limited to a triangle shown and described. The crux is that use is made of an aggregation of structural bodies each having surfaces inclined to the display surface of the LCD. Again, the angle α made between the two inclined surfaces should preferably lie in the previously stated desirable range. Further, as shown in FIGS. 22–26, a plurality of structures may be combined. In the five specific configurations shown in the figures, there are included surfaces which are parallel to or inclined to the display surface of the LCD. Although such a configuration makes the angle ic indefinite, the indefinite angle ic is rather advantageous in that the LCD appears natural to the viewer's eye. When each prism has an equilateral triangular cross-section, it has an optical characteristic which is symmetrical about the axis z in the direction x, as viewed in FIG. 16 or 27. It follows that when use is made of LCD elements operable in a polymer dispersion mode or a dynamical scattering mode in which the optical characteristic is isotropic in the cell plane, the entire LCD will also have a symmetrical characteristic. When the cross-section of the prism is not an equilateral triangle, such symmetry of optical characteristic is not obtainable. However, since this kind of symmetry is not always required of an LCD, the cross-section is not limited to an equilateral triangle.

Figure 28:
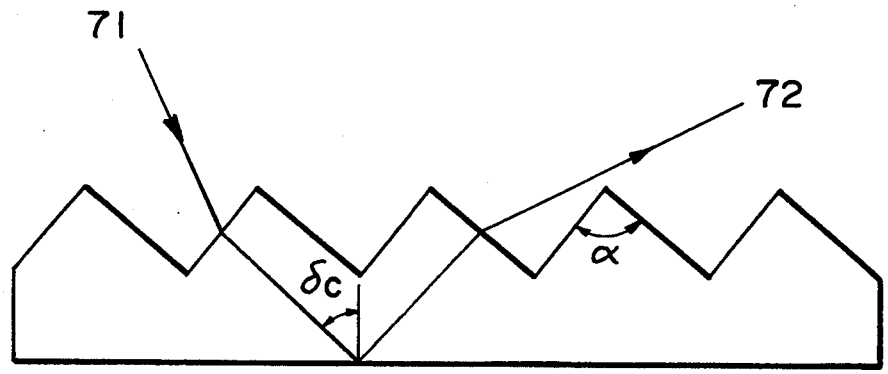
FIG. 28 is a section showing selective reflecting means having inclined prisms, together with the path of light incident to the reflecting means at a critical angle.
Figure 29:
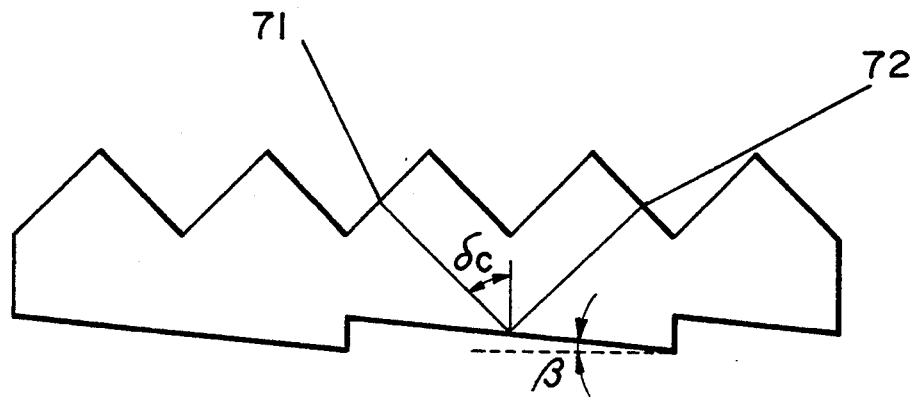
FIG. 29 is a section showing selective reflecting means in which the bottoms of prisms are inclined, together with the path of light incident to the reflecting means at a critical angle.

FIGS. 28 and 29 show respectively a specific configuration in which the prisms are inclined and a specific configuration in which the bottoms of the prisms are inclined. In the figures, the reference numerals 71 and 72 designate the optical paths of light each being located at the critical angle δc of total reflection. These configurations are feasible for, among others, applications in which the elements are viewed in the oblique direction, since the angular range of transmitted light can be made asymmetrical with respect to the normal.

Figure 30:
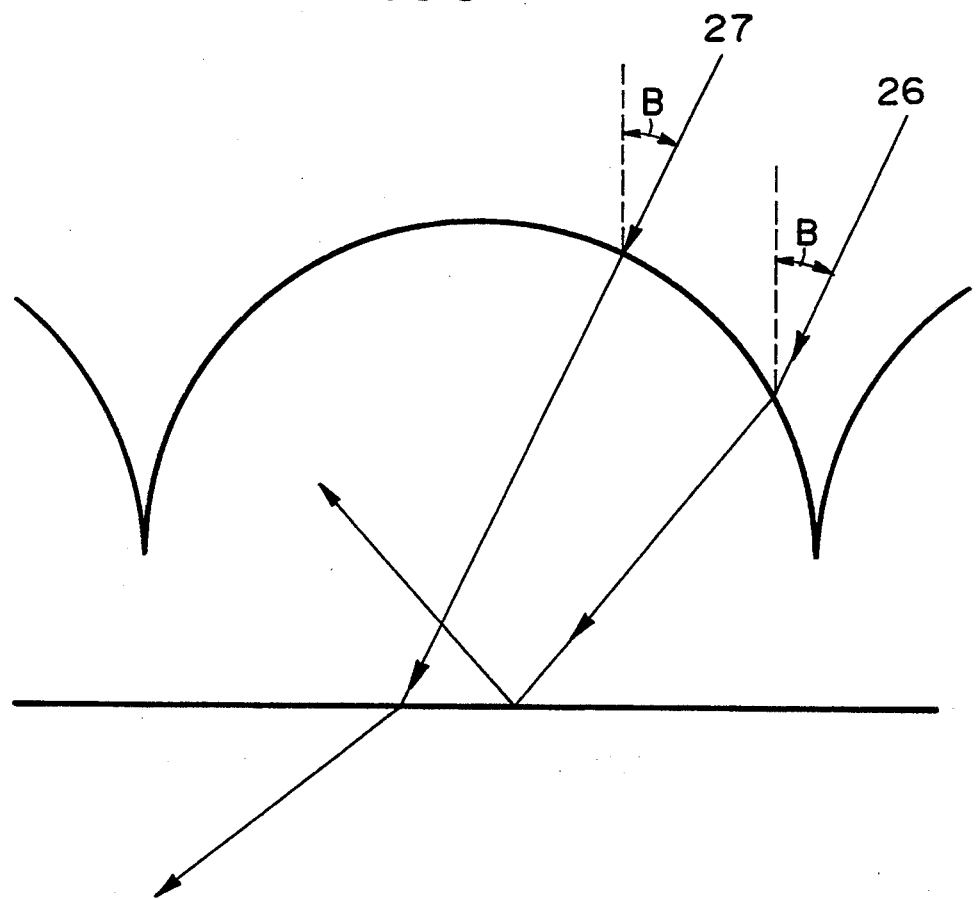
FIG. 30 is a section showing a lenticular lens array sheet in which each prism has a generally semicircular cross-section, together with the paths of light incident to the sheet at an angle $\beta$.

Assume that a lenticular lens array sheet in which each lens does not have a triangular cross-section, but has a substantially semicircular cross-section. In this case, light is propagated through each lens along the paths shown in FIG. 30. As shown, although light 26 and 27 are incident to the sheet surface at the same angle B, they are reflected or transmitted by the sheet, depending on the incident point. The greater the incidence angle B, the more the total reflection is promoted, as in the case of the prism array sheet. However, the difference is that the light incident to the lower portion of the lens is totally reflected more than the light incident to the upper portion. Hence, the characteristic does not sharply change at a particular angle although it does change in the prism array sheet.

Figure 31:
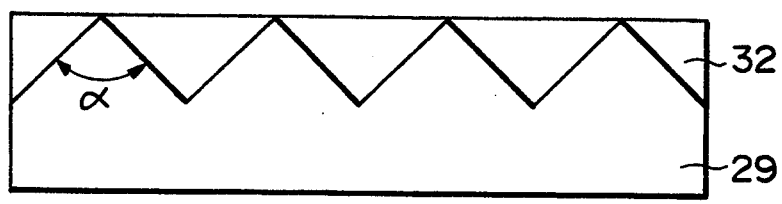
FIG. 31 is a section showing another specific configuration of the selective reflecting means.

FIG. 31 shows another specific configuration of the selective reflecting means implemented by the prism array sheet 29. As shown, a layer 32 is formed on the sheet 29 for various purposes, e.g., to protect the prism structure and to control the refractive index. To provide the sheet 29 with the above-stated incidence angle selectivity, the layer 32 should be made of a material whose refractive index is smaller than that of the prism structure.

As described above, the selective reflecting means in accordance with the present invention may be formed at any location of the flat transparent substrate.

The selective reflecting means may be made of any one of almost all of transparent materials, e.g., glass and other inorganic materials, and resins including polystyrene, polyester, polycarbonate, polyolefin, polyarylate, polysulfone, polyether sulfone, polacrylate, epoxy resins, polysilicone, polyvinyl alcohol, and acetylcellulose. While the refractive indices of the materials generally range from 1.4 to 1.7, some glasses for optical applications have a refractive index of about 2.0.

Figure 32:
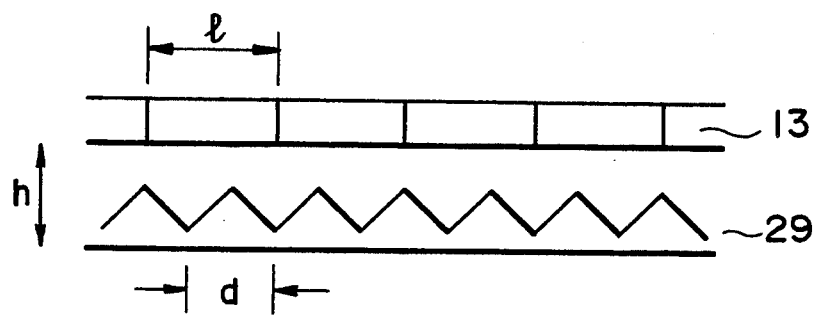
FIG. 32 shows the pitch d of the prism array sheet included in the LCD of the present invention, the pixel pitch l of the liquid crystal dispersion layer in the direction x, and the distance h between the sheet and the dispersion layer.

Assume a prism array sheet made up of a plurality of arrays of elongate prisms extending in one direction, the direction of the arrays substantially coinciding with the lengthwise direction. Then, the prism structure has a pitch d (see FIG. 32) preferably ranging from 0.01 mm to 1 mm, more preferably from 0.02 mm to 0.5 mm. Should the pitch d be excessively small, the prism structure itself would be difficult to form and increase the cost. Should the pitch d be excessively great, the prism structure would be visible and degrade the display quality. Assume that the prism array sheet 29 has a pitch d, that the pixels of the dispersion layer 13 has a pitch l in the direction x, and that the distance between the sheet 29 and the dispersion layer 13 is h. Then, if d and h are excessively great relative to l, although light incident to a prism via a given pixel, which is in the scattering state, is not always propagated through the same pixel; particularly, the pixel does not appear sufficiently light when the surrounding pixels are in the transmitting state. For this reason, it is preferable that the pitch d of the sheet 29 and the distance h between the sheet 29 and the dispersion layer 13 be not excessively large relative to the pixel pitch l. Preferably, the pitch d is less than twice the pixel pitch l, desirably less than the pitch l. Generally, the distance h between the dispersion layer 13 and the reflecting or diffusing element should preferably be less than five times the pixel pitch l, desirably less than twice the pitch l.

The absorbing means 20, which is positioned at the rear of the reflecting or diffusing element, can be implemented by any desired material so long as it absorbs light, e.g., metal or plastic. Generally, the absorbing means 20 should preferably be colored black, in which case the LCD will turn out a black-and-white display. When the absorbing means 20 is chromatic, the LCD will turn out a color-and-white display. While light absorbing means may be applied or otherwise deposited on the bottom of the prisms, it is necessary that the light absorbing means be sufficiently smaller in refractive index than the prisms in order to cause total reflection on the bottoms of the prisms.

As stated above, by using selective light reflecting or diffusing means, the present invention enhances the contrast of a diffusion type LCD to thereby realize light display. However, this kind of implementation has the following problem. Referring to FIGS. 17 and 18 by way of example, when pixel are transparent, light inclined more than the critical angle, i.e., 36° is substantially totally reflected by the prism array sheet. As a result, when the LCD is viewed from the direction of the reflected light 15, even the transparent pixels appear light to the viewer, reducing the contrast to a noticeable degree. Although observing an LCD from the direction of regular reflection is rare, experiments showed that the contrast is noticeably lowered by illumination from the direction x even when observed at the front.

Figure 27:
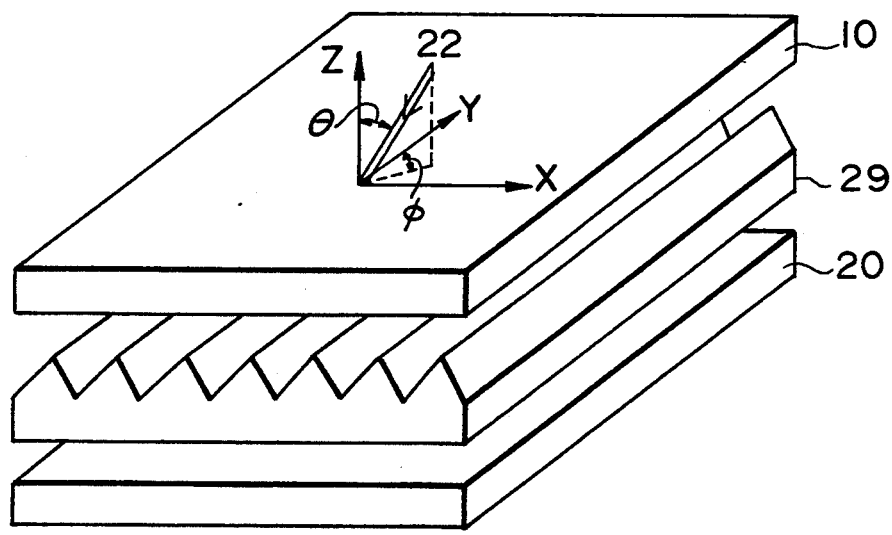
FIG. 27 shows x, y, z, $\theta$ and $\phi$ associated with FIG. 30.
Figure 33:
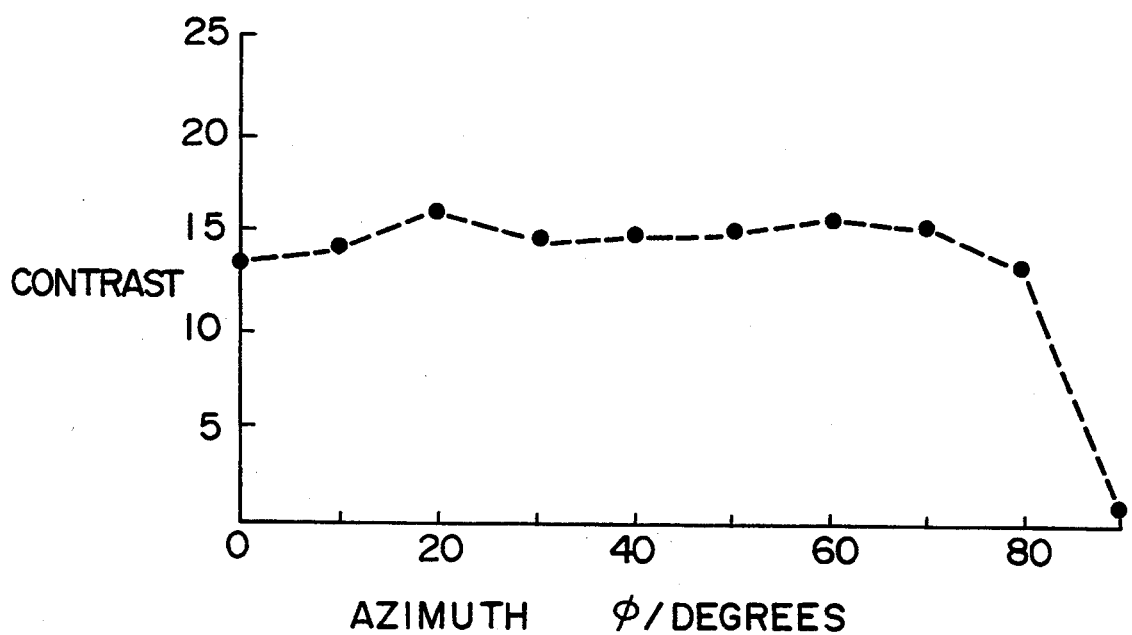
FIG. 33 is a graph indicative of the dependency of contrast on illumination direction and determined with a reflecting element having prisms whose apex angle $\alpha$ is 100°.

FIG. 33 is a graph indicative of the dependency of contrast on illumination direction as determined with the prism array sheet 29 having an apex angle α of 100°. The directions to be described are shown in FIG. 27. The measurement was performed in the direction (z) perpendicular to the surface of the LCD (surface of sheet and surfaces of LCD elements). Assume that the incidence angle of the illumination light 22 is θ, that the azimuth φ is the angle between the lengthwise direction y of the prisms and the vector of the incident light projected onto the x-y plane. The graph of FIG. 33 pertains to a condition wherein the illumination light is incident at an angle of 30°. As the graph indicates, while the contrast remains high over the azimuth of 0° to approximately 80°, it sharply decreases when the azimuth exceeds 80°. When the LCD elements are operable in the dynamic scattering mode or the polymer dispersion mode, the optical characteristic of LCD cells is isotropic in the cell plane. This indicates that contrast lowers only when the azimuth φ is around 90° and 180°.

In the light of the above, the present invention proposes a configuration wherein the azimuth φ is not close to 90° or 180° in the ordinary condition of use of LCD elements. Specifically, in such a configuration, the lengthwise direction y of the prism array does not extend in the right-and-left direction as seen from the viewer's side. If the direction y is coincident with the right-and-left direction, then the viewer will be located in the x-z plane and, therefore, the illumination light from the overhead lighting equipment will have an azimuth of 90° or 180°, critically lowering the contrast. This occurs without regard to the position of the lighting equipment in the plane containing the viewer and z and occurs often under ordinary lighting environments. To avoid the decrease in contrast, the LCD would force the viewer to see it sideways and, therefore, would be extremely awkward to use.

On the other hand, when the lengthwise direction y of the prism array is coincident with the up-and-down or front-and-rear direction as seen from the viewer's side, the azimuth $\phi$ is 90° or 180° only when the lighting equipment is located in a plane perpendicular to the LCD surface and traversing it sideways. This kind of situation is rare under ordinary lighting environments and can be coped with, if occurred, by slightly changing the elevation of the LCD surface.

In another specific construction of the present invention, the selective reflecting means 30 shown in FIG. 4 or the prism array sheet 29 shown in FIG. 27 is not fixed in orientation, but it is rotatable within the plane thereof in matching relation to the lighting environment. This allows the LCD to be brought to an orientation most convenient for operation.

Figure 34:
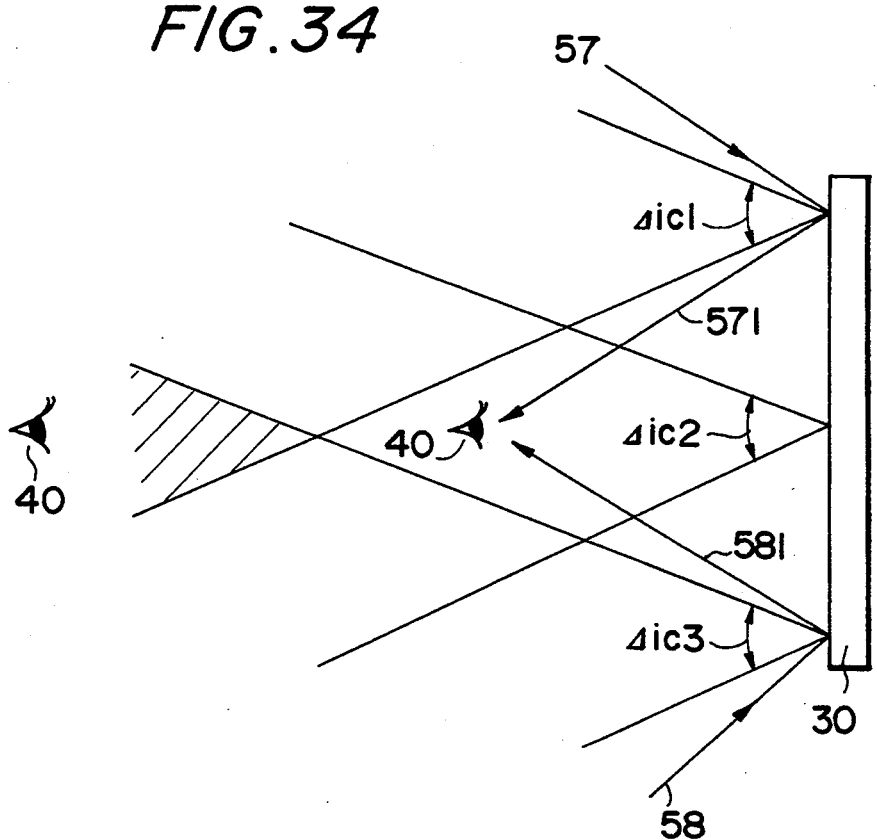
FIG. 34 shows how the contrast in the peripheral portion of a reflecting element decreases depending on the viewer's position.

Assume that the LCD element have a broad area and the viewer stands relatively close to it, or that the selective reflecting means is provided with an extremely narrow range of transmitted incident light. This is apt to cause the contrast in the peripheral portions of the element to decrease, as will be described with reference to FIG. 34. In FIG. 34, $\Delta ic1$, $\Delta ic2$ and $\Delta ic3$ are respectively indicative of angular ranges in which reflections from the top, center and bottom of the display section are not observed in the non-scattering state. In the figure, the LCD cell is not shown for the simplicity of description. So long as the viewer is positioned in the area indicated by hatching, the reflections from the non-scattering pixels do not reach the viewer's eye 40 with the result that a high contrast is insured over the entire area of the element. However, when the viewer's eye 40 is located in the other position shown in the figure, reflections 571 and 581 from the non-scattering pixels located at the top and bottom of the element are incident to the eye 40, lowering the contrast at the edge portions.

Figure 35:
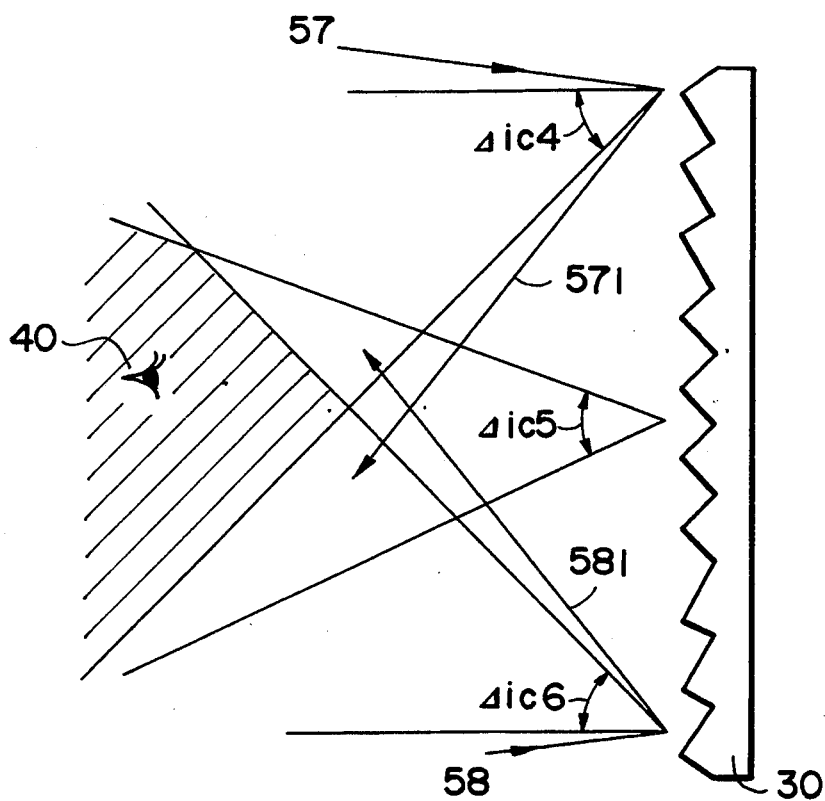
FIG. 35 shows selective reflecting means configured to reduce visual field angle dependency, together with the paths of light incident to the reflecting means.

If desired, the angle selectivity of the selective reflecting means may be changed depending on the portion of the LCD element. Then, reflections from non-scattering pixels will be prevented from reaching the viewer without regard to the portion of the display section of the element. To adjust the angle selectivity of the reflecting means, it is desirable to change the prism structure depending on the portion of the element. FIG. 35 shows a specific and preferable configuration of the selective reflecting means. As shown, the prisms corresponding to the central part of the element are each provided with an equilateral triangular cross-section and, therefore, selectively transmits light lying in an angular range $\Delta ic5$. On the other hand, the prisms located at the edge portions of the element are provided with an inclined triangular cross-section; light transmitted through these prisms lie in angular ranges $\Delta ic4$ and $\Delta ic6$ which are directed toward the viewer 40. As a result, the light 571 and 581 from the non-scattering portions are visible over the entire screen, implementing uniform and high contrast display. While the prism structure of the selective reflecting means shown in FIG. 35 is generally made up of three different portions for the simplicity of description, it may be divided more minutely or may be changed continuously. This is more desirable from the field angle and uniformity standpoint. Although the prism structure of FIG. 35 is mirror-symmetrical, it may be asymmetrical depending on the viewer's position.

Figure 36:
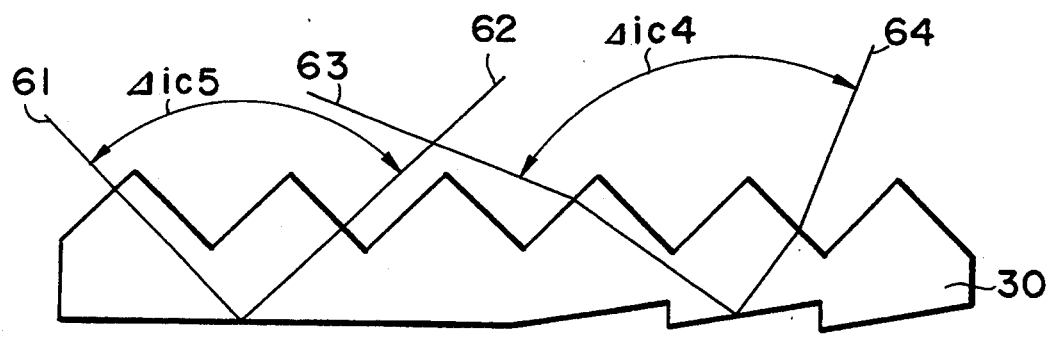
FIG. 36 shows selective reflecting means also configured to reduce field angle dependency, together with the paths of light incident to the reflecting means.

FIG. 36 shows another preferred configuration of the selective reflecting means having the field angle dependency thereof reduced. As shown, parts of the bottoms of the prisms, e.g., the upper and lower ends of the display section are inclined in a saw-tooth configuration so as to change the angle selectivity. The bottoms should preferably be inclined toward the viewer. While the saw-teeth are provided with the same pitch as the prisms overlying them, the former may be provided with a different pitch from the latter. Further, the inclination angle of the bottoms may be continuously changed; this is also more preferable from the field angle and uniformity standpoint.

Figure 38:
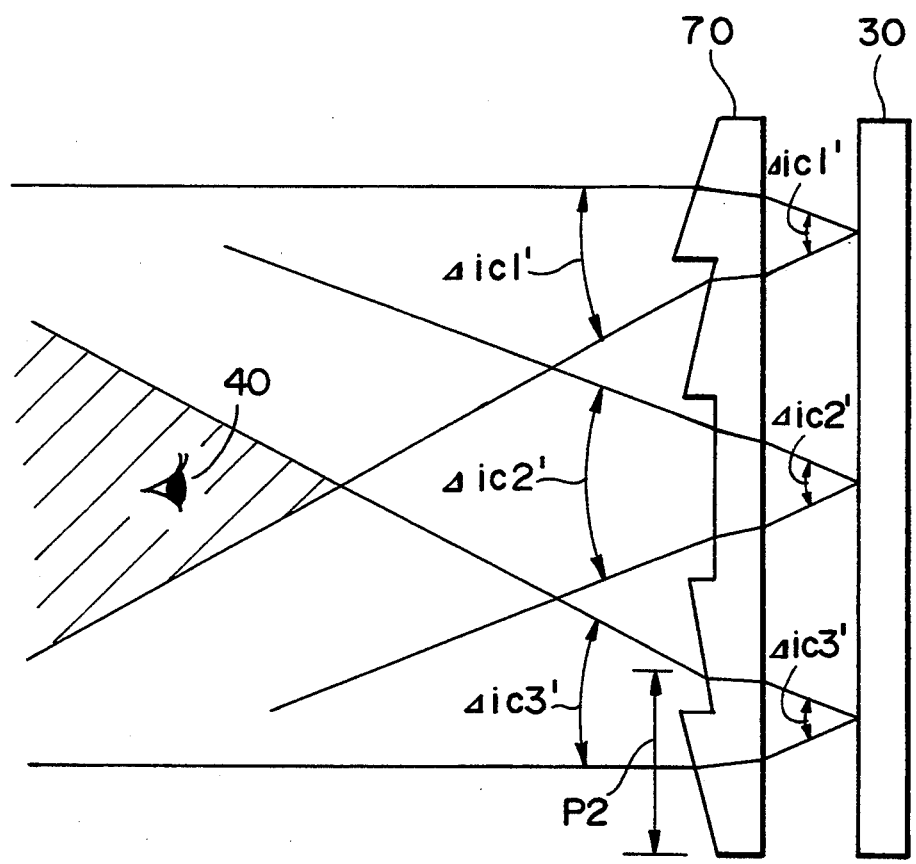
FIG. 38 shows selective reflecting means provided with a Fresnel lens playing the role of path changing means.

In another embodiment of the present invention having the selective reflecting means and provided with improved field angle dependency, means for changing the optical paths is interposed between the viewer and the selective reflecting means, as follows. The path changing means changes the selective reflection/transmission angle of the reflecting means, thereby bending the angular range of transmitted light toward the viewer. FIG. 38 shows a preferred arrangement of this kind. As shown, path changing means 70 is provided on the underside of the liquid crystal cell, not shown, and implemented by a Fresnel lens and the selective reflecting means 30 is provided on the underside of the path changing means 70. Further, the absorbing means, not shown, is provided on the underside of the selective reflecting means 30. Assume that the transmission angle of the reflecting means is uniform by way of example. Since a transmission angle range $\Delta ic2'$ defined at the center is hardly susceptible to the influence of the Fresnel lens, reflections from non-scattering pixels do not reach the viewer, causing the display section to appear black. At the edges of the element, the wedge-shaped Fresnel lens bends the optical paths inward with the result that the observation direction is contained in the transmission angle range ($\Delta ic1'$ and $\Delta ic3'$). This allows the pixels at the edges to appear black in the same manner as the pixels at the center.

The present invention is practicable with any one of conventional LCD display system so long as it changes the light scattering characteristic by, for example, a voltage. Examples of this kind of system are a dynamic scattering system, a phase transition system, a polymer dispersion system or similar system using nematic liquid crystals, a system using the thermo-electro-optic effect of smectic liquid crystals, and a system using the light scattering of ferroelectric liquid crystals. The problem with such conventional systems is that when the light scattering ability is increased to implement a high contrast, the required operation voltage is increased. For example, increasing the thickness of the LC layer, reducing the cholesteric pitch in the phase transition system, and reducing the size of LC droplets in the polymer distribution system are effective to enhance the light scattering ability. However, none of them is practicable without increasing the drive voltage. When the present invention is applied to any one such systems, the light scattering ability and, therefore, contrast is enhanced for the same cell as conventional, or the drive voltage is lowered for the same contrast as conventional.

Particularly, in an LCD of so-called polymer dispersion type wherein a liquid crystal layer is made up of a crystal region and a support configured to divide the crystal region minutely, it is difficult to achieve the lower voltage drive and the high light scattering ability at the same time. In this respect, the present invention having the above-stated advantages is advantageously applicable this type of LCD.

The present invention is not limited regarding the internal structure of the polymer dispersion layer. The crux is that a polymer or similar support divides the liquid crystal region minutely in one form or another. For example, there may be used a droplet structure wherein liquid crystals, typified by a dispersion layer produced by an emulsion method or similar method, are dispersed in the support in the form of substantially spherical droplets, or a network structure wherein the support has a mesh configuration and crystals in the mesh are communicated to each other. The network structure is easy to form by photo polymerization. It is to be noted that the word "minutely" mentioned above generally refers to a range of from 0.2 μm to 10 μm.

The dispersion layer may have a thickness similar to the thickness of the conventional polymer dispersion type LCD and generally ranges from 3 μm to 30 μm. Also, the ratio of liquid crystals to support may be the same as in the conventional polymer dispersion type display element; generally, liquid crystals have a ratio of 40% to 90% to the entire film. Some different methods have been reported for forming such a dispersion structure. The methods include one which applies and dries an emulsion of aqueous solution of polyvinyl alcohol or similar water-soluble polymer and liquid crystals (emulsion method); one which dissolves a soluble polymer and liquid crystals in a solvent to prepare a uniform solution, applies and dries it, and causes the phase separation of the polymer and liquid crystals to occur during drying (solvent evaporation method); one which seals an acryl monomer or similar optical polymerizable substance, liquid crystals and polymerization initiator in between an upper and a lower substrate, and radiates ultraviolet rays to polymerize the polymerizable substance to thereby cause phase separation to occur (optical polymerization method); and one which seals a mixture of thermo polymerizable substance, e.g., epoxy compound and hardener therefor, and liquid crystals in between an upper and a lower substrate, and causes it to polymerize by heat for thereby causing phase separation (thermal polymerization).

Specific examples of the present invention will be described hereinafter.

EXAMPLE 1

3 Wt % of Darocurl 173, which is a photo polymerization initiator available from Merck, was added to a prepolymer KAYARAD HX620 available from Nippon Powders to prepare a photosetting resinous composition. Glass substrates carrying transparent conductive films were laid on the resinous composition with the intermediary of a 6 μm thick spacer, thereby forming a liquid crystal cell having a cell gap of 6 μm. BL036, which is a liquid crystal composition available from Merck, and a photosetting resinous composition were mixed such that the content of the former was 70 Wt %. The resulting mixture was heated to a temperature high enough to make the liquid uniform, and then injected into the cell. Subsequently the cell was radiated by a high-voltage mercury-vapor lamp to polymerize the prepolymer, thereby causing the phase separation of the liquid crystals and polymer to occur. As a result, a liquid crystal cell 1 having a polymer dispersion type liquid crystal layer was obtained. Angle 21-c, which is a visual field angle selecting glass available from Nippon Sheet Glass (ic1=26.5°, ic2=−26.5°) was positioned immediately below the cell 1 and parallel to the cell 1 as a selective reflector. Further, light absorbing means implemented as a black film having a rough surface was disposed immediately below the selective reflector to complete a reflection type LCD element A having the structure of FIG. 4.

Figure 1:
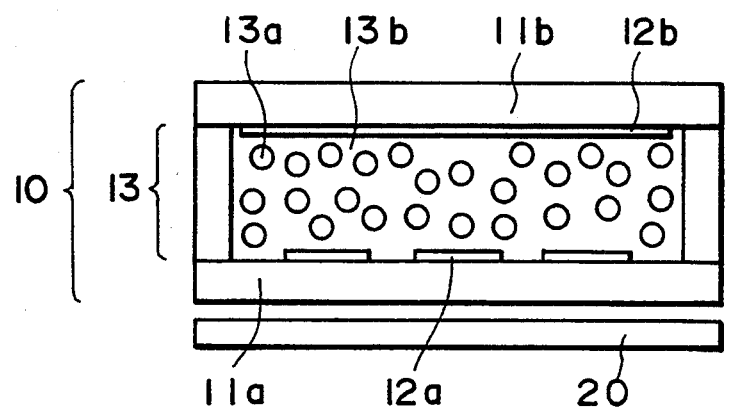
FIG. 1 is a section showing a conventional polymer dispersion type LCD.

For comparison, a conventional reflection type LCD element R1 having the structure of FIG. 1 and lacking the selective diffusing means was fabricated.

When the two LCD elements A and R1 were observed at the front in a room lighted by a fluorescent lamp, both of them appeared desirably black when applied with a voltage of 20 V. However, when the voltage was not applied, the element A was apparently higher in scattered light intensity than the element R1.

EXAMPLE 2

Example 1 was repeated except that the selective diffusing means was implemented by a selective diffuser exhibiting a scattering characteristic only in one direction in which ic1 was +26.5°. When the resulting LCD element B and the comparative element R1 were observed under the same conditions as in Example 1, both of them appeared desirably black when applied with a voltage of 20 V. However, when the voltage was not applied, the element B was apparently higher in scattered light intensity than the element R1.

EXAMPLE 3

3 Wt % of Darocurl 173, which is an optical polymerization initiator available from Merck, was added to a prepolymer KAYARAD HX620 available from Nippon Powders to prepare a photosetting resinous composition. Glass substrates having transparent conductive films were laid on the resinous composition with the intermediary of a 6 μm thick spacer, thereby forming an liquid crystal cell having a cell gap of 6 μm. BL036, which is a liquid crystal composition available from Merck and a photosetting resinous composition were mixed such that the content of the former was 70 Wt %. The resulting mixture was heated to a temperature high enough to make the liquid uniform, and then injected into the cell. Subsequently the cell was radiated by a high-voltage mercury-vapor lamp to polymerize the prepolymer, thereby causing the phase separation of the liquid crystals and polymer to occur. As a result, a liquid crystal cell 1 having a polymer dispersion type liquid crystal layer was obtained. In FIG. 16, a selective reflector made of polycarbonate (refractive index of 1.58) and having a prism array provided with an apex angle of 90° and a pitch of 0.3 mm was disposed immediately below and parallel to the cell 1. The selective reflector had a selective transmitted light range of +36° and which was symmetrical with respect to a line normal to the display surface, while functioning as a reflector for the other incident light. Further, absorbing means in the form of a black film having a rough surface was located immediately below the selective reflector, thereby completing a reflection type LCD C having the structure shown in FIG. 5.

For comparison, a conventional reflection type LCD R2 having the structure of FIG. 1 and lacking the selective reflecting means was fabricated.

Further, a light source unit made up of a 4 W hot cathode tube, reflector, shield and a color louver was located at and above the edge portion of the selector reflector. The light source was positioned such that light issuing therefrom was incident to the reflector at an angle smaller than 45°.

When the above-stated two LCDs were observed under the same conditions as in Example 1, both of them appeared desirably black when applied with a voltage of 20 V. However, when the voltage was not applied, the element C of the present invention was apparently higher in scattered light intensity than the element R2. In addition, even when the illumination was turned off, a more light background was obtained with the LCD C than with the LCD R2.

EXAMPLES 4–11

By the procedure of Example 3, LCDs each having a selective reflector having a particular prism structure listed in Table 1 below were fabricated. Although the preferable apex angle range depended on the material, a high contrast was achieved by selecting the apex angle within the range of from 30° to 150°.

TABLE 1

| Ex. No. | Material | Refractive Index | Apex Angle | Field Range (Evaluation) | Contrast |
|---|---|---|---|---|---|
| 2 | polydimethyl siloxane | 1.42 | 30 | ±30° (△) | ○ |
| 3 | polydimethyl siloxane | 1.42 | 90 | ±50° (○) | ○ |
| 4 | polymethyl metacrylate | 1.48 | 60 | ±35° (○) | ○ |
| 5 | polymethyl metacrylate | 1.48 | 90 | ±42° (○) | ○ |
| 6 | polymethyl metacrylate | 1.48 | 120 | ±48° (○) | ○ |
| 7 | polycarbonate | 1.58 | 70 | ±30° (△) | ○ |
| 1 | polycarbonate | 1.58 | 90 | ±36° (○) | ○ |
| 8 | polycarbonate | 1.58 | 120 | ±45° (○) | ○ |
| 9 | polycarbonate | 1.58 | 150 | ±55° (○) | △ |

In Table 1, circles and triangles mean "good" and "acceptable", respectively.

EXAMPLE 12

In Example 3, a selective reflector having a bottom inclined 7° ($=\beta$), as shown in FIG. 29, was used. As a result, a field angle range of −20° to 50° and asymmetrical with respect to the normal was set up. When the LCD was observed in a direction inclined 15°, an extremely high contrast was achieved.

EXAMPLE 13

In Example 1, a selective reflector having a prism structure inclined ($\gamma=15°$) as shown in FIG. 28 was used. As a result, the field angle range was −20° to −50° and asymmetrical with respect to the normal. When the LCD was observed in a direction inclined 15°, an extremely high contrast was achieved.

EXAMPLE 14

Example 3 was repeated except that the selective reflector had the configuration shown in FIG. 35. Specifically, in the reflector, the prisms were sequentially inclined outwardly in proportion to the distance between the center to the edge of the reflector. The LCD element was sized 200 mm×200 mm. The inclination angle was 10° at the edges of the reflector. When the element was observed at the front at a distance of as short as 120 mm, no irregularities were found in the display. By contrast, with the element of Example 3, uniform display was unachievable unless it was spaced apart more than 150 mm from the viewer.

EXAMPLE 15

Example 3 was repeated except that the selective reflector had the configuration shown in FIG. 36. Specifically, in the reflector, the bottoms of the prisms located at the center were not inclined while the bottoms of the other prisms were sequentially inclined inwardly in proportion to the distance between the center and the edge. The LCD element was sized 200 mm×200 mm. The prisms at the edges of the reflector have their bottoms inclined 5°. When the element was observed at the front at a distance as short as 120 mm, no irregularities were found in the display. By contrast, with the element of Example 3, uniform display was unachievable unless it was spaced apart more than 150 mm from the viewer.

EXAMPLE 16

Figure 37:
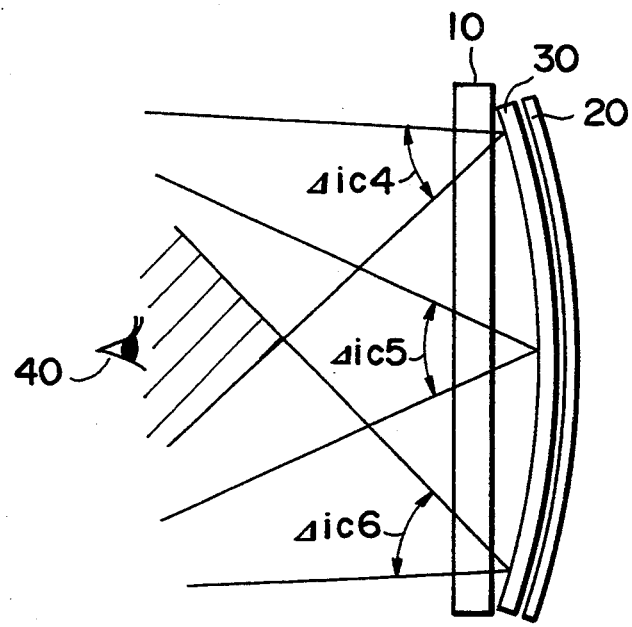
FIG. 37 shows selective reflecting means also configured to reduce field angle dependency.

Example 3 was repeated except that the selective reflector was provided with a radius of curvature of 600 mm, as shown in FIG. 37. The LCD element was sized 200 mm×200 mm. When the element was observed at the front at a distance of 120 mm, no irregularities were found in the display. By contrast, with the element of Example 3, uniform display was unachievable unless it was spaced apart more than 150 mm from the viewer.

EXAMPLE 17

Example 3 was repeated except that a Fresnel lens (focal distance of 400 mm) having the configuration of FIG. 38 was inserted between the selective reflector and the liquid crystal cell. The LCD element was sized 200 mm×200 mm. When the element was observed at the front at a distance of 120 mm, no irregularities were found in the display.

EXAMPLE 18

8 Wt % of S811, which is a liquid crystalline optical active substance available from Merck and induces a counterclockwise twisted structure in nematic liquid crystals, was added to liquid crystalline BL007 also available from Merck to prepare a liquid crystal composition. Glass substrates having transparent electrodes and subjected to homeotropic processing by a silane-based aligning agent were joined together with the intermediary of a 6 μm thick spacer. Then, the liquid crystal composition was injected into the gap between the substrates to form a phase transition type liquid crystal cell. Example 3 was repeated, except that such a cell was substituted for the polymer dispersion type cell, to fabricate a reflection type LCD element. For comparison, a phase transition type LCD element lacking the selective reflecting means was produced. When the two LCD elements were observed at the front in a room lighted by a fluorescent lamp, both of them appeared desirably black when applied with a voltage. However, the element of Example 18 was apparently higher in scattered light intensity than the other when no voltages were applied.

EXAMPLE 19

About 2% of an optical polymerization initiator Darocurl173 available from E. Merck was added to an acryl-based prepolymer HX620 available from Nippon Powders and then mixed with liquid crystals BL007 also available from E Merck. The ratio of the liquid crystals to the polymer was 3:1. The mixture was applied to a glass substrate provided with ITO by a bar coater. Subsequently, the glass substrate was put in a glass container, and then the interior of the container was replaced with nitrogen. When the glass substrate was radiated by an ultraviolet ray radiating device having a radiation intensity of 50 mW/cm$^2$ for 30 minutes, a light scattering dispersion film was obtained and measured to be about 6 μm thick. IPET (polyethyrene phthalate elongated by one axis) with ITO was bonded to the surface of the substrate where the dispersion film was formed, such that the ITO surface faced the film. As a result, a light scattering LCD element corresponding to the cell 10 of FIG. 1 was fabricated.

A 90° prism array sheet SOLF available from 3M (in FIG. 16, α=90°) was laid on a black paper, and the above-stated LCD element was laid on the prism array sheet. The cell appeared more light than when the sheet was absent. This was true with either side of the prism array. When a drive voltage was applied to the ITO of the LCD element, the cell became transparent. At this instant, when the prisms of the sheet faced upward (liquid crystal side), the black sheet at the bottom of the laminate appeared to provide a high contrast. However, when the sheet was upside down, i.e., the prisms faced downward (black paper side), the reflectivity of the sheet was emphasized and provided hardly any contrast.

Figure 39:
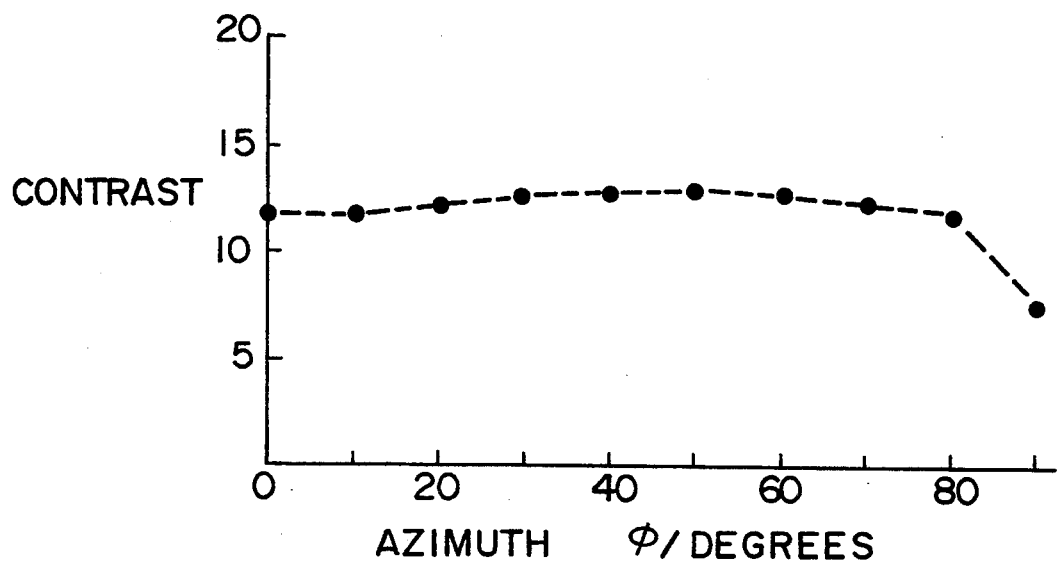
FIG. 39 is a graph indicative of a relation between the azimuth $\phi$ of illumination and the contrast particular to an LCD fabricated by Example 18.

The cell was observed in various directions while being turned on and turned off. When the cell was seen obliquely in the direction perpendicular to the grooves of the prism sheet, the contrast noticeably lowered. However, this did not occur when the cell was seen in the other directions, except when intentionally seen at an extremely low position. The display surface was illuminated in the oblique direction (in FIG. 27, θ=30°). As the illuminating direction was rotated (in FIG. 27, φ was changed) with the display surface being observed at the front, the contrast lowered only when the illuminating direction was almost coincident with the direction perpendicular to the grooves of the prism sheet. This is indicated in FIG. 39.

EXAMPLE 20

Figure 40:
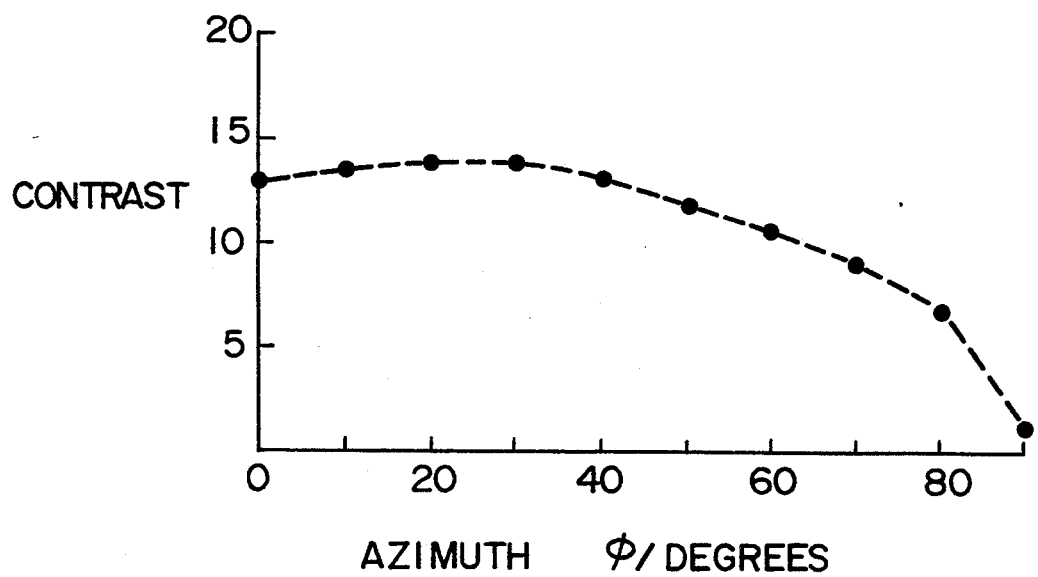
FIG. 40 is a graph indicative of a relation between the azimuth $\phi$ of illumination and the contrast particular to an LCD fabricated by Example 19.

A 70° prism array sheet TRAF available from 3M (in FIG. 16, α=70°) was laid on a black paper, and the cell fabricated by Example 1 was laid on the sheet. The prism array sheet was positioned such that the prisms thereof faced upward (liquid crystal side). The display surface was illuminated in the oblique direction (in FIG. 27, θ=30°). When the illuminating direction was rotated (in FIG. 27, φ was changed) with the display surface being observed at the front, the contrast lowered only when the illuminating direction was almost coincident with the direction perpendicular to the grooves of the prism sheet. This is indicated in FIG. 40. When the azimuth of illumination was small, the contrast was higher than the contrast available with Example 1. As the azimuth approached 90°, the contrast sequentially lowered; at the azimuth around 90°, the contrast was even lower than in Example 1. However, a contrast higher than 5 was obtained even at an azimuth of 80°. All that is required is, therefore, avoiding the direction of 90°.

Assuming the display of a word processor or that of a computer, the black paper, prism sheet and liquid crystal cell put together were stood on end and oriented such that the grooves of the prisms extended in the up-and-down direction. In this condition, the display on the cell could be seen over a wide range of directions since illumination by overhead lighting could not be perpendicular to the grooves.

EXAMPLE 21

Example 19 or 20 was repeated except that a lenticular lens sheet array having a semicircular cross-section was substituted for the prism array sheet having a triangular cross-section. The other conditions were the same as in Example 2. When the sheet was positioned such that the grooves extended in the up-and-down direction, display with a high contrast could be seen over a wide range of directions.

COMPARATIVE EXAMPLE 1

Example 20 was repeated except that only the prism array sheet was rotated to a position where the grooves extended horizontally. When the cell was transparent, light from the overhead lighting was brightly reflected to lower the contrast to a critical degree.

In summary, it will be seen that the present invention provides a reflection type LCD having various unprecedented advantages, as enumerated below.

(1) Selective light reflecting or diffusing means introduces forwardly scattered light components from scattering pixels again into a liquid crystal layer without effecting non-scattering pixels. Hence, high reflection intensity and, therefore, high contrast is achieved. In addition, it is possible to produce intense light scattering without increasing the light scattering ability of the liquid crystal layer. This lowers the required drive voltage for the same contrast.

(2) A light source unit is positioned such that at least a part of illumination light is reflected in the reflection angle range of the selective reflecting means. Hence, forward scattering with high scattered light intensity can be used, insuring extremely light white display. Due to the angle selectivity of the selective reflecting means, non-scattering pixels appear black and provide black-and-white display as clear and high in contrast as printings.

(3) When the selective reflecting means is implemented by a group of prisms formed on a flat transparent substrate, desirable incidence angle selectivity is achievable, further enhancing the contrast. Moreover, when the prisms are provided with a particular configuration, a broad field angle and a high contrast are obtained.

(4) When the angle selectivity of the selective reflecting means is made asymmetric, high contrast display is achievable even in an application wherein a viewer sees the display obliquely.

(5) When the angle selectivity of the selective reflecting means is different from one point to another of the reflecting means, even a broad display surface is provided with a uniform and high contrast over the entire area.

(6) When the liquid crystal layer is implemented by polymer dispersion type liquid crystals, not only a high contrast but also a rapid response are obtained. Hence, the LCD is adaptive even to a motion picture.

(7) The selective reflecting means is constituted by a prism array sheet having an array of prisms extending in substantially the lengthwise direction. When the reflecting means is oriented such that the lengthwise direction of the prisms substantially does not coincide with the right-and-left direction as seen from the viewer's side, display with a high contrast is achieved over a broad range.

Various modifications will become possible for those skilled in the art after receiving the teachings of the present disclosure without departing from the scope thereof.

What is claimed is:

1. A reflection type liquid crystal display (LCD) having a cell made up of a pair of spaced light transmitting substrates each having transparent electrodes on an inner surface thereof, and a dispersion layer of liquid crystals held between said pair of substrates, and using a phenomenon that said dispersion layer turns to a transmitting state when applied with a voltage or to a scattering state when not applied with a voltage, said LCD comprising:

at least one of selective light reflecting means and selective light diffusing means having angle selectivity and provided on a rear of said dispersion layer with respect to a viewer for transmitting light incident thereto from a viewer's side at angles lying in a particular range and reflecting and scattering, respectively, light incident at angles lying in the other range; and light absorbing means provided on a rear of said at least one of said selective light reflecting means and said selective light diffusing means for absorbing incident light.

2. An LCD as claimed in claim 1, wherein said dispersion layer comprises a liquid crystal region and a support dividing said liquid crystal region minutely.

3. An LCD as claimed in claim 1, wherein said selective light diffusing means reflects, when said dispersion layer is in the transparent state, the light in an angular range which causes said light to leave said LCD in a direction not visible to the viewer.

4. An LCD as claimed in claim 1, wherein said selective reflecting means reflects, when said dispersion layer is in the transparent state, the light in an angular range which causes said light to leave said LCD in a direction not visible to the viewer.

5. An LCD as claimed in claim 1, wherein said selective reflecting means comprises a prism array sheet having a group of prisms formed on a surface of a flat transparent substrate.

6. An LCD as claimed in claim 5, wherein said group of prisms each has a substantially triangular cross-section and an apex angle of 30° to 150°.

7. An LCD as claimed in claim 5, wherein said group of prisms have a pitch which is less than twice a pixel pitch of said cell.

8. An LCD as claimed in claim 5, wherein a distance between said dispersion layer and said prism array sheet is less than five times a pixel pitch of said cell.

9. An LCD as claimed in claim 5, wherein said prism array sheet comprises a plurality of arrays of elongate prisms extending in one direction, said plurality of arrays extending in a direction substantially coincident with a lengthwise direction, said prism array sheet being oriented such that a lengthwise direction of said prisms substantially does not coincide with a right-and-left direction as seen from a viewer's side.

10. An LCD as claimed in claim 9, wherein said prism array sheet is oriented such that the lengthwise direction of said prisms is substantially coincident with an up-and-down direction or a front-and-rear direction as viewed from the viewer's side.

11. An LCD as claimed in claim 5, wherein said prism array sheet is rotatable such that a lengthwise direction of said prisms coincides with a direction matching a lighting environment.

12. An LCD as claimed in claim 5, wherein said prism array sheet has angle selectivity differing from one portion to another portion of said prism array sheet.

13. An LCD as claimed in claim 5, wherein said prism array sheet has angle selectivity implemented by a difference in prism structure.

14. An LCD as claimed in claim 13, wherein the difference in prism structure is provided by at least one of an inclination of a triangular prism structure and an inclination of a bottom of the prism.

15. An LCD as claimed in claim 1, wherein said selective light reflecting means comprises a lenticular lens array sheet having a group of lenses each having a substantially semicircular cross-section.

16. An LCD as claimed in claim 5, wherein said selective light reflecting means comprises prisms arranged bidimensionally.

17. An LCD as claimed in claim 5, wherein said selective light reflecting means has a refractive index of 1.4 to 2.0.

18. An LCD as claimed in claim 1, further comprising light source means for illuminating said selective light reflecting means.

* * * * *